(12) United States Patent
Phuyal et al.

(10) Patent No.: US 10,271,243 B2
(45) Date of Patent: Apr. 23, 2019

(54) PDCP STATUS REPORTING FOR MULTI-RAT OFFLOADING

(71) Applicant: INTEL IP CORPORATION, Santa Clara, CA (US)

(72) Inventors: Umesh Phuyal, Beaverton, OR (US); Shu-Ping Yeh, Campbell, CA (US); Nageen Himayat, Fremont, CA (US); Mo-Han Fong, Sunnyvale, CA (US); Alexander Sirotkin, Petach Tikva (IL); Jing Zhu, Portland, OR (US); Jerome Parron, Fuerth (DE); Candy Yiu, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/565,458

(22) PCT Filed: Dec. 8, 2015

(86) PCT No.: PCT/US2015/064448
§ 371 (c)(1),
(2) Date: Oct. 10, 2017

(87) PCT Pub. No.: WO2016/186697
PCT Pub. Date: Nov. 24, 2016

(65) Prior Publication Data
US 2018/0124642 A1 May 3, 2018

Related U.S. Application Data

(60) Provisional application No. 62/165,090, filed on May 21, 2015, provisional application No. 62/166,414, filed on May 26, 2015.

(51) Int. Cl.
*H04W 4/00* (2018.01)
*H04W 28/08* (2009.01)
(Continued)

(52) U.S. Cl.
CPC ........... *H04W 28/08* (2013.01); *H04L 1/00* (2013.01); *H04L 1/1614* (2013.01); *H04L 1/18* (2013.01);
(Continued)

(58) Field of Classification Search
CPC ..... H04W 28/08; H04W 24/10; H04W 76/16; H04W 76/15; H04W 88/06; H04W 88/10;
(Continued)

(56) References Cited

U.S. PATENT DOCUMENTS

| 2010/0272007 | A1 | 10/2010 | Shen et al. | |
| 2011/0228746 | A1* | 9/2011 | Chun | H04W 28/06 370/331 |

(Continued)

FOREIGN PATENT DOCUMENTS

WO 2012148482 A1 11/2012

OTHER PUBLICATIONS

Notification Concerning Transmittal of International Preliminary Report on Patentability of the PCT with Written Opinion, PCT/US2015/064448, dated Nov. 30, 2017, 11 pages.
(Continued)

*Primary Examiner* — Clemence S Han
(74) *Attorney, Agent, or Firm* — Spectrum IP Law Group LLC

(57) ABSTRACT

Briefly, in accordance with one or more embodiments, an apparatus of user equipment (UE) comprises circuitry to receive data transmissions as packet data convergence protocol (PDCP) packets from a radio bearer via two or more Radio Access Technologies (RATs). One or more PDCP packets are offloaded from a first RAT to a second RAT. The apparatus comprises circuitry to aggregate the received data PDCP packets, and report a status of the PDCP packets to the radio bearer.

24 Claims, 10 Drawing Sheets

(51) Int. Cl.

| | | |
|---|---|---|
| *H04W 76/15* | (2018.01) | |
| *H04W 80/02* | (2009.01) | |
| *H04W 88/06* | (2009.01) | |
| *H04W 88/10* | (2009.01) | |
| *H04L 1/00* | (2006.01) | |
| *H04L 1/18* | (2006.01) | |
| *H04W 76/16* | (2018.01) | |
| *H04L 1/16* | (2006.01) | |
| *H04W 24/10* | (2009.01) | |
| *H04W 36/00* | (2009.01) | |

(52) U.S. Cl.
CPC ........... *H04W 24/10* (2013.01); *H04W 76/15* (2018.02); *H04W 76/16* (2018.02); *H04W 80/02* (2013.01); *H04W 88/06* (2013.01); *H04W 88/10* (2013.01); *H04W 36/0069* (2018.08)

(58) Field of Classification Search
CPC ........ H04W 80/02; H04L 1/1614; H04L 1/18; H04L 1/00
See application file for complete search history.

(56) References Cited

U.S. PATENT DOCUMENTS

| | | | |
|---|---|---|---|
| 2012/0224525 A1 | 9/2012 | Wang et al. | |
| 2012/0281564 A1 | 11/2012 | Zhang et al. | |
| 2014/0050086 A1* | 2/2014 | Himayat | H04N 21/2365 370/230 |
| 2014/0254393 A1* | 9/2014 | Yi | H04W 24/10 370/242 |
| 2015/0023370 A1 | 1/2015 | Sammour et al. | |
| 2016/0338074 A1* | 11/2016 | Chou | H04W 76/046 |
| 2017/0367141 A1* | 12/2017 | Nagasaka | H04W 76/16 |
| 2017/0374579 A1* | 12/2017 | Wang | H04W 28/08 |
| 2018/0092147 A1* | 3/2018 | Pelletier | H04L 63/205 |
| 2018/0255488 A1* | 9/2018 | Kim | H04W 36/0055 |

OTHER PUBLICATIONS

Notification of Transmittal of the International Search Report and Written Opinion, PCT/US2015/064448, dated Mar. 31, 2016, 23 pages.

Extended European Search Report issued in European Application No. 15892791.3, dated Oct. 19, 2018, 16 pages.

Alcatel-Lucent, et al., "Architecture for LTE-WiFi aggregation," Discussion, Apr. 20-24, 2015, 5 pages, R2-151478, 3GPP, Bratislava, Slovakia.

Intel Corporation, "PDCP Reordering for Split Bearer," Discussion, Mar. 31-Apr. 4, 2014, 3 pages, R2-141201, 3GPP, Valencia, Spain.

Kyocera, "User Plane Aspects to Support Uplink Split Bearer," Discussion, Apr. 20-24, 2015, 5 pages, R2-151539, 3GPP, Bratislava, Slovakia.

Intel Corporation, et al., "New SI Proposal: LTE-WLAN Radio Level Integration and Interworking Enhancement," Document for Approval, Mar. 9-12, 2015, 8 pages, RP-150262, 3GPP, Shanghai, China.

Intel Corporation, "User Plane Aspects of LWA," Discussion, Aug. 24-28, 2015, 4 pages, R2-153513, 3GPP, Beijing, China.

Intel Corporation, "User Plane Architecture for NR," Discussion, Aug. 22-26, 2016, 9 pages, R2-156006, 3GPP, Gothenburg, Sweden.

Intel Corporation, et al., "Avoiding HFN Desync in UL over WLAN," Discussion, Nov. 14-18, 2016, 3 pages, R2-168580, 3GPP, Reno, NV.

* cited by examiner

PDCP STATUS REPORTING FOR MULTI-RAT OFFLOADING

CROSS REFERENCE TO RELATED APPLICATIONS

This application claims priority under 35 U.S.C. § 371 to International Application No. PCT/US2015/064448 filed Dec. 8, 2015 which in turn claims the benefit of U.S. Provisional Application No. 62/165,090 filed May 21, 2015 and the benefit of U.S. Provisional Application 62/166,414 filed May 26, 2015. Said Application No. PCT/US2015/064448, said Application No. 62/165,090 and said Application No. 62/166,414 are hereby incorporated herein by reference in their entireties.

BACKGROUND

Current multi-layer network architectures using a Third Generation Partnership Project (3GPP) Long Term Evolution (LTE) standard are based on anchor/booster and carrier aggregation frameworks. Current 3GPP Release 12 solutions support inter-site traffic offload/aggregation between a Master Cell or Master Evolved Node B (MeNB) and a Secondary Cell or Secondary eNodeB (SeNB). Here the LTE user plane connection is anchored at the Master eNB and user plane traffic is offloaded to the SeNB below the Packet Data Convergence Protocol (PDCP) layer. 3GPP Release 12 prescribes several features that allow for efficient operation for inter site traffic offload and aggregation.

Packet Data Convergence Protocol (PDCP) Status reporting on the secondary link to avoid transmit buffer buildup is one such feature. When traffic is offloaded via a different link from the LTE PDCP layer, the status of successful completion or no completion of PDCP packets offloaded via the secondary path may be signaled to the aggregation control engine at the PDCP layer. This information may be obtained, per the current standard, in Radio Link Control Acknowledged-mode (RLC AM), and Packet Data Convergence Protocol) (PDCP) status/acknowledgment (ACK) in normal communication may be derived from receiver to the transmitter entity using RLC sequence number (SN) Status transfer message, which is not able to incorporate the information of offloaded PDCP packets. In the absence of PDCP status report on successful completion for offloaded packets, the transmitter cannot clear its buffer in an efficient manner. While the transmitter PDCP entity may clear its buffer based on PDCP discard timer, the typical settings of this timer may result in a large number of PDCP packets being stored in the transmit buffer, even though they have already been delivered successfully via the offloaded path. This can result in transmitter buffer overload, unnecessary forwarding of PDCP packets during handover or unnecessary transmissions during connection re-establishment due to, for example, Radio Link Failure (RLF), Handover (HO) failure, integrity check failure, Radio Resource Control (RRC) connection reconfiguration failure, and so on.

PDCP Status reporting on the secondary link to avoid Hyper Frame Number (HFN) desynchronization is another feature. Additionally, PDCP status reporting for offloaded packets is required for PDCP Sequence Number (SN) control in order to avoid Hyper Frame Number (HFN) desynchronization during inter-site aggregation. Due to traffic offload on multiple links, the PDCP packets may arrive out-of-order at the receiver, and the receiver has to reorder the PDCP before delivering them in-sequence to the PDCP receiver. Since the PDCP SN space is limited based on the number of bits used for the SN, HFN desynchronization is possible if the transmitter does not control the PDCP SN in flight because of this inability to have up-to-date information. For this reason and to avoid over flow of the reordering buffer, the transmitter should ensure that no more than half of PDCP SN space is introduced in flight at the transmit PDCP entity.

Flow Control of Traffic Offloaded to Secondary Cells is yet another feature. How and when the PDCP packets are offloaded to the secondary link also may be managed, so as to avoid buffer build up or overflow at the SeNB. Dynamic offload control is also required for enhancing inter-site aggregation performance.

Dual Connectivity Enhancements to Support Inter-Site Aggregation is a further feature. 3GPP Release 12 supports PDCP status reporting and flow control via the GTP-U interface between the MeNB and the SeNB for efficient traffic offloading operation. Here, the SeNB can use RLC AM to derive PDCP packet delivery status and report it to MeNB via a downlink (DL) DATA DELIVERY STATUS. Further, support for traffic flow control is also supported on this interface. Using network based PDCP status reports, flow control and feedback mechanism is more efficient than relying on user equipment (UE) support, as information can be exchanged more frequently and avoids UE complexity, power consumption and air interface overhead. For LTE WLANN Aggregation (LWA), the Xw interface may be utilized instead of the X2 interface, and a WLAN Termination (WT) entity instead of a SeNB.

Extensions to General Multi-RAT Architectures is yet a further feature. Similar extensions are also required for a more general LTE anchored multiple Radio Access Technology (multi-RAT) architectures, such as those envisioned for Wireless Local Area Network (WLAN) in accordance with an Institute of Electrical and Electronics Engineers (IEEE) 802.11 Wireless Local Area Network or future Fifth Generation (5G RAT) aggregation based on LTE anchored multi-radio access networks. In particular, the 3GPP Release 13 LTE-WLAN Aggregation (LWA) solution, with ongoing work item in 3GPP RAN2 and RAN3, is based on dual connectivity framework adopted for WLAN, so that WLAN Termination (WT) replaces the SeNB, said WT communicates with WLAN APs or ACs and mechanisms for network based delivery status reports, flow control and feedback. Such solutions, however, require changes to at the WLAN access point (AP) or access controller (AC) to support the interface to the eNB. Ensuring broad deployments of LWA may involve consideration of alternatives that can minimize impact to legacy WLAN network deployments. Further changes involved at the AP to support a network based solution should be considered.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 1:
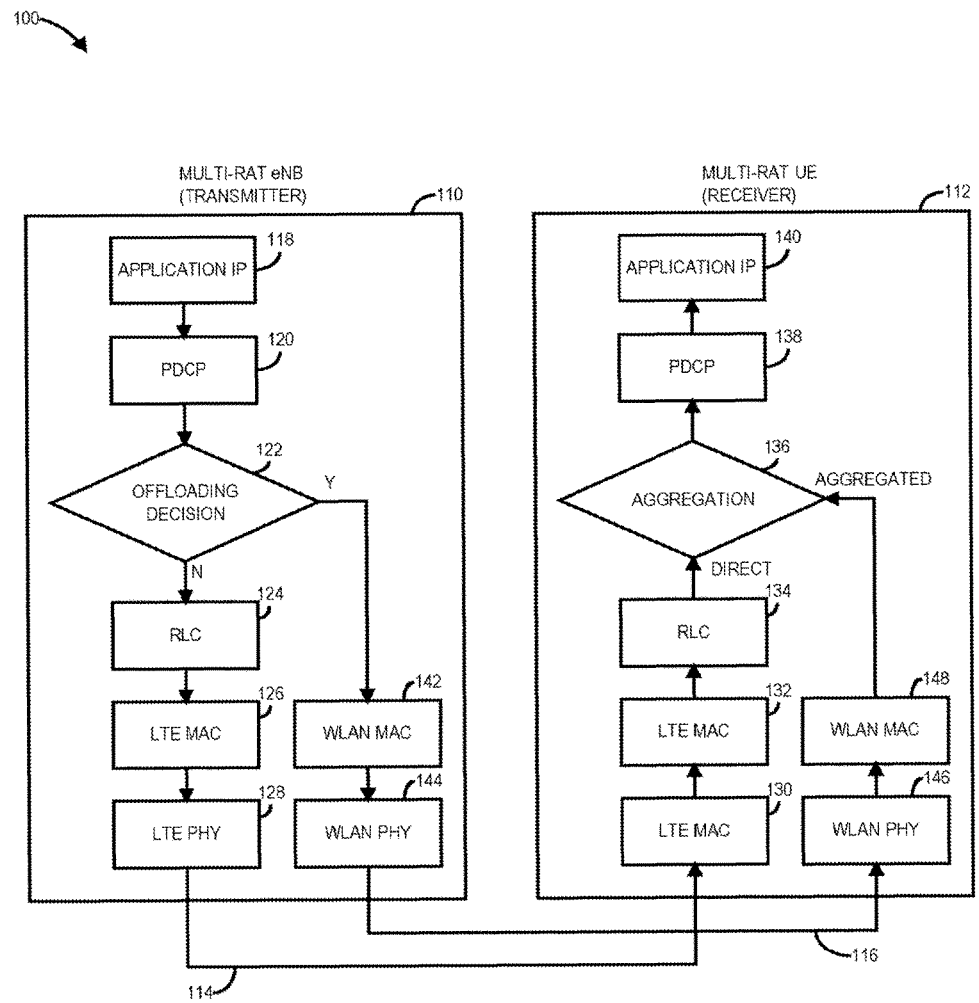
FIG. 1 is a diagram illustrating an example of WLAN offloading of LTE PDCP packets in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. However, "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Referring now to FIG. 1, a diagram of network 1000 illustrating an example of WLAN offloading of Long Term Evolution (LTE) Packet Data Convergence Protocol (PDCP) packets in accordance with one or more embodiments will be discussed. It should be noted that the following description utilizes examples of downlink multi-radio aggregation where the network node such as an evolved Node B (eNB) 110 is the transmitter and the user equipment (UE) 112 is receiver for purposes of example. The scope of the claimed subject matter, however, is not limited in such a downlink arrangement, and the signals, methods and/or procedures may be utilized in uplink multi-radio aggregation in which case the UE becomes the transmitter and the network node becomes receiver, among other examples.

FIG. 1 illustrates network an example where Long Term Evolution (LTE) Long Term Evolution (LTE) packets transmitted using a first radio access technology (RAT) such as a wireless wide area network (WWAN) technology such as LTE may be offloaded to a different RAT such as a wireless local area network (WLAN) technology such as an Institute of Electrical and Electronics Engineers (IEEE) 802.11 a/b/c/g/n/ac standard or the like. For example, data to be transmitted from Multi-RAT eNB 110 by application internet protocol (IP) block 118 may packetized by Packet Data Convergence Protocol (PDCP) block 120, and an offloading decision may be made at block 122. If packets are not offloaded, then they may be transmitted via an LTE radio link control (RLC) block 124, LTE media access control (MAC) block 126, and LTE PHY block 128, transmitted via LTE path 114 to Multi-RAT UE 112. Multi-RAT UE 112 then processes the received packets via LTE PHY block 130, LTE MAC block 132, and LTE RLC block 134. The received packets may then be processed with PDCP block 138 to be received by application IP block 140.

The decision to transmit one or more PDCP packets via LTE or to offload one or more PDCP packets to another RAT such as WLAN may be made by offloading decision block 122. Based on offloading criteria, certain PDCP packets may be offloaded from the WWAN path 114 to the WLAN path 116. Such offloaded packets may be marked with appropriate headers, for example LWA Adaptation Protocol (LWAAP), or identified using different EtherType, and sent to a WLAN access point (AP) (not shown). These packets pass through WLAN MAC block 142 and WLAN PHY block 144 to be transmitted via WLAN path 116, and then the packets are received by WLAN PHY block 146 and WLAN PHY block 148 at the multi-RAT UE 112 receiver. The UE 112 removes the offloading headers, if applicable, and sends the offloaded PDCP packets to the aggregation block 136 which aggregates the offloaded traffic packets with the direct path traffic packets to be sent to upper layers such as PDCP block 138 and application IP block 140.

When RLC Acknowledge Mode (AM) is used, the receiver side RLC entity, such as RLC block 134, will send RLC status Protocol Data Unit (PDU) to the sender, such as eNB 110, which enables RLC block 124 at eNB 110 to indicate to the PDCP block 120 which PDCP packets sent via the LTE path 114 successfully made it to the UE 112. The eNB 110 then removes such indicated PDCP packets from the transmit buffer. Similarly, for packets that are offloaded via a different RAT, for example using WLAN, similar status reports from the WLAN AP (not shown) to the sender also may be supported.

According to current standards, the receiver side PDCP does not send PDCP status report for normal offloading scenarios. In accordance with one or more embodiments, PDCP status reporting is utilized to avoid data buildup and overflow in the transmit buffer. PDCP status reporting also avoids forwarding of unnecessary packets in case of a handover. Furthermore, in cases of connection re-establishment, for example after radio link failure (RLF), Handover (HO) failure, mobility from evolved universal mobile telecommunication system (UMTS) terrestrial radio access (E-UTRA) failure, integrity check failure or radio resource control (RRC) connection reconfiguration failure, for data radio bearers (DRBs) mapped to Radio Link Control Acknowledged-mode (RLC AM), the transmitting PDCP entity may be required to perform retransmission or transmission of all the PDCP service data units (SDUs) already associated with PDCP sequence numbers (SNs) from the first PDCP SDU for which the successful delivery of the corresponding PDCP PDU has not been confirmed from lower layers. The PDCP reports may avoid unnecessary retransmissions of PDCP packets which may have been already successfully transmitted via the offloading path such as via WLAN path 116.

Additionally, because PDCP SN space is limited based on the number of bits used for SN, hyper frame number (HFN) desynchronization is possible because of this inability to have up-to-date information if more number of PDCP packets than half of SN space is associated with active/in-flight PDCP packets, not discarded or indicated to be completed, at the transmitting PDCP entity at any time. In some embodiments, how to prevent the HFN desynchronization problem may be left up to implementation by the UE 112. One possible implementation to avoid this situation is to not create more PDCP packets than half the number of SN space, equal to the size of reordering window, at any time. This arrangement combined with the potential situation that a large portion of the SN space still may be occupied may result in PDCP getting stalled unnecessarily for certain periods of times, resulting in unnecessary wait periods for the packets. Such a situation potentially may increase end-to-end latency which is undesirable for all traffic in general and may be unacceptable for certain delay-sensitive applications.

In accordance with one or more embodiments, a UE 112 based PDCP status reporting and flow control mechanism may be utilized that minimizes network side impact to WLAN APs in support for 3GPP Release 13 or later LTE-WLAN Aggregation (LWA) feature. While the discussion herein focuses on LWA as an example, similar enhancements are possible for more generalized multi-RAT architectural extensions, for example LTE Fifth Generation (LTE-5G) RAT, LTE Wireless Gigabit Alliance (LTE-WiGiG), or aggregation between any two anchor and secondary RAT used for offloading traffic from a primary RAT to a secondary RAT using the protocol convergence layer of the primary RAT, both in the uplink and/or in the downlink. In particular, one or more embodiments may be directed to the use of UE based PDCP status reports to provide ACK/NACK reports. Several methods including in-band reporting of PDCP packets are defined herein. Furthermore, UE 112 based feedback required to assist the master evolved Node B (master eNB) in dynamic traffic routing over multiple links and details of radio resource management solutions at the master eNB. In addition, enhancements to the network interface between the master eNB and a secondary eNB or WT to allow for enhanced radio resource management as well as clarifications on how the WLAN AP can support PDCP status reports and flow control are also included.

One or more embodiments are directed to providing an efficient UE 112 based mechanism for implementing PDCP status reports for offloaded packets to the LTE PDCP entity at the transmitter. The UE 112 receiver may send such reports via in-band signaling or other mechanisms periodically or on demand. The PDCP status report can then be used to infer the average delay in sending the offloaded packets, which may be utilized by the transmitter to adjust the proportion of packets offloaded to the secondary radio link. Additionally, one or more embodiments are directed additional feedback mechanisms over the Master eNB to a Secondary eNB network interface such as a WLAN AP, which allows for enhanced offloading. The feedback mechanisms also clarify the procedures with which the WLAN AP can report the PDCP status report to the MeNB.

In addition, one or more embodiments address PDCP transmit buffer build up, HFN desynchronization, and flow control in support for aggregation. Network based approaches typically cannot easily be utilized with legacy WLAN deployments. Therefore, UE 12 based approaches that minimize WLAN AP are provided herein in accordance with one or more embodiments.

In one or more embodiments, UE 112 based PDCP status reporting may be implemented. Current specifications allow for UE 112 to send PDCP status reports per bearer during handover. In accordance with one or more embodiments, LTE procedures are modified to send PDCP status reports when the UE 112 is in connected mode supporting the LTE-WLAN Aggregation (LWA) operation as shown in and described with respect to FIG. 1. It should be noted, however, that LWA is merely one example approach, and other approaches likewise may be applicable to more general multi-RAT aggregation solutions, and the scope of the claimed subject matter is not limited in this respect.

The in-band PDCP status report is described in 3GPP Technical Standard (TS) 36.323 and may be utilized for this purpose. One approach is to have UEs 112 send PDCP status reports wherein the PDCP status report bit map starts from but not including the first missing PDCP SN and ends at the last out-of-order received PDCP packets. For this reporting format, the status of all packets transmitted on LTE and WLAN may be reported. In some embodiments, the transmit buffer does not keep track of which packets were offloaded over the WLAN link 116. Rather, the transmit buffer simply removes from the buffer the PDCP packets that are successfully acknowledged via an acknowledgment (ACK) message.

It should be noted that the purpose of PDCP status report for LWA may be different from the purpose of PDCP status reporting for PDCP reestablishment. The target is to use the PDCP status report to infer the acknowledgement/negative acknowledgement (ACK/NACK) status of PDCP packets offloaded over WLAN. As a result, the reporting bit map size may be reduced if the transmit buffer keeps track of which PDCP packets are offloaded over WLAN and which PDCP packets are transmitted through LTE. It should be further noted that the PDCP packet sent on the LTE link can be acknowledged based on RLC AM status report. Furthermore, PDCP packets from the same UE 112 should be delivered in sequence over WLAN. There may be a small amount of out-of-order delivery on WLAN due to message protocol data unit (MPDU) aggregation, but the time window to monitor WLAN out-of-sequence delivery should be small. The two criteria to determine the range for the bit map are first that the reporting bit map must cover all PDCP packets offloaded to WLAN that are successfully transmitted or are dropped after the maximum number of retransmissions is reached, and second that the overlap between the bit maps of two successive PDCP status reports should be minimized to reduce signaling overhead.

One potential simplification of such an arrangement may be summarized as follows. The UE should keep track of the last PDCP packet that is successfully received over WLAN in the last PDCP status report. Denote the SN of this packet as SNlastRxWLAN. For a new report, identify the NWLANReOrder latest missing PDCP that should be delivered before the PDCP with sequence number: SNlastRxW-LAN. NWLANReOrder specifies the reordering window size for WLAN out-of-order delivery. If there are fewer than NWLANReOrder missing PDCP packets, set First Missing Sequence Number (FMS) as the SN of the first missing PDCP. If there are more than NWLANReOrder missing PDCP packets, select the SN of the one that should be delivered first among the NWLANReOrder latest missing PDCP. If NWLANReOrder is 0, there is no WLAN out-of-order delivery and the FMS can be selected as the SN of the first missing PDCP that should be delivered after the PDCP packet of sequence number: SNlastRxWLAN. To determine the bit map size, identify PDCP packets that are successfully transmitted over WLAN and are supposed to be delivered after the PDCP with SN: FMS. If there is no PDCP packet that should be delivered after the FMS PDCP successfully received over WLAN, in some embodiments the bit map is not allocated, and the SNlastRxWLAN may be updated as the last successfully received WLAN PDCP SDU that should be delivered before FMS. If there is at least one PDCP packet that should be delivered after the FMS PDCP successfully received over WLAN, allocate a bit map of length in bits equal to the number of PDCP SNs from and not including the FMS up to and including the last successfully received WLAN PDCP packets, rounded up to the next multiple of eight. The SNlastRxWLAN should be updated to the SN of the last successfully received WLAN PDCP packet.

PDCP status report for LWA may or may not trigger PDCP-level retransmission. It should be noted that PDCP-level retransmission is generally not allowed in a current 3GPP standard except in the case of PDCP reestablishment. Reporting schemes described above can enable PDCP-level retransmission for PDCP packets offloaded over WLAN since the entire ACK/NACK status of all WLAN delivery is reported. Based on the SN of the last successfully received WLAN PDCP and maximum out-of-sequence WLAN delivery window, the MeNB may locally estimate which WLAN transmissions are completed, successful or failed, and initiate retransmission for completed WLAN PDCP with NACK status. Given that the bit maps of successive PDCP status reports may overlap with each other, the MeNB should also be aware of whether a retransmission is already initiated to avoid duplicated PDCP retransmission.

Further simplification of such an approach may be made by defining a new report message format which only reports the PDCP SN of the last successfully received PDCP that is offloaded over WLAN. The report may contain not only the highest successfully received PDCP PDU or WLAN, but also the highest successfully received PDCP PDU on LTE and also the number of lost PDCP PDUs. It should be noted that this modification may not support PDCP-level retransmission. After receiving the status report of the last successfully received WLAN PDCP, transmit buffer can remove all PDCP packets that are offloaded to WLAN and their transmissions are completed, whether successful or failed, based on the SN of the last successfully received WLAN PDCP and maximum out-of-sequence WLAN delivery window. This procedure also may involve the PDCP transmitter tracking which packets were sent on WLAN and LTE links.

In one or more embodiments, PDCP status report may be generation by the WLAN Termination (WT). It should be noted that that for the network based reporting of PDCP packet status, the WLAN AP tracks the mapping of a PDCP packet to the WLAN MAC packet or packets and then generate the PDCP status based on success or failure of the associated MAC packet or packets.

One or more embodiments may be directed to utilization of a PDCP status report by the MeNB for dynamic bearer splitting and cross-RAT retransmission. The PDCP status report may be used by the MeNB to infer the packet delay on the WLAN link 116. This information may be further used to perform packet-by-packet scheduling across the multiple links. For example, the MeNB may adjust the packet split ratios to equalize the delay experienced on both links. Further UE feedback on WLAN link quality also may be obtained for this purpose. An example algorithm which may be used by the eNB may be as follows.

From the last received WLAN PDCP COUNT, a number representing the PDCP SN, but takes care of the wrap around issue when SN reaches max SN. COUNT always increases as new PDCP packet transmitted, of the previous UE feedback, say Nlast(n-1), and the last received WLAN PDCP COUNT of current UE feedback, say, Nlast(n), the eNB 110 can identify the PDCP packets within the transmit buffer that are offloaded to WLAN and are with PDCP COUNT, N, between Nlast(n-1) and Nlast(n). Denote the set of PDCP COUNT for PDCP packets offloaded to WLAN as SWLAN. The eNB is also aware of the packet size of the WLAN PDCP packets identify in above manner as they are still stored in the transmit buffer to handle potential case of future handover.

The WLAN Drain Rate may be estimated as follows:

$$R_{WLAN,drain\_est}(n) = \frac{\sum_{N>N_{last}(n-1), N \in S_{WLAN}}^{N \leq N_{last}(n)} PktSize(N)}{T_{Feedback\_interval}}$$

The reporting interval between successive PDCP status reports is denoted as TFeedback_interval. The drain rate can also be estimated over more than one feedback intervals:

$$R_{WLAN,drain\_est}(n) = \frac{\sum_{N>N_{last}(n-k), N \in S_{WiFi}}^{N \leq N_{last}(n)} PktSize(N)}{k \cdot T_{Feedback\_interval}}$$

The WLAN Buffer Size can be estimated as follows:

$$BufSize_{WLAN\_est}(n) = \sum_{N>N_{last}(n), N \in S_{WLAN}} PktSize(N) - R_{WLAN,drain\_est}(n) \cdot T_{FeedbackDelay}$$

The last term is used to estimate the amount of data transmitted over WLAN during the delay between UE feedback and when the offloading decision is made. The offloading algorithm may use different target metrics. For example, the offloading algorithm may equalize buffer sizes of LTE & WLAN by comparing BufSizeWLAN_est and BufSizeLTE_est. The offloading algorithm further may equalize the PDCP packet reception time between LTE & WLAN by comparing"

$$\frac{BufSize_{WLAN\_est}(n)}{R_{WLAN,drain\_est}(n)} \text{ and } \frac{BufSize_{LTD\_est}(n)}{R_{LTE,drain\_est}(n)}$$

If a more accurate estimate of Rate and Buffer size typically occurs on the LTE link then some additional scaling factor or error compensation may be applied to the parameters estimated for the WLAN link.

In one or more embodiments the PDCP status report may be utilized by the MeNB for PDCP Discard and Flow Control. According to 3GPP TS 36.323, how to prevent HFN desynchronization problem is left up to UE 112 implementation. Discussed herein are procedures to prevent HFN desynchronization and clarify how the existing procedures specified in TS 36.323 may be modified to support it. Here, PDCP SN are not assigned for any incoming upper layer packet if more than half the sequence number, for example equal to the SN reordering window size. In other words, SN will not be assigned if the next SN is not within reordering window size from the oldest SN still active/in-flight. To do this, the upper layer data may be buffered before PDCP SN is assigned. The following procedural steps are shown in terms of changes to the current text in 3GPP TS 36.323 which assumes the UE 112 is the PDCP Transmitter. The eNB in the DL, however, can follow an analogous procedure. The procedure discussed below may be included in TS 36.323, Section 5.1.1, as indicated.

5.1.1 UL Data Transfer Procedures
At reception of a PDCP SDU from upper layers, the UE shall:
  start the discard Timer associated with this PDCP SDU (if configured);
For a PDCP SDU received from upper layers, the UE shall:
  check the PDCP TX buffer and find out the oldest PDCP SN still active (Oldest_PDCP_TX_SN)
    If PDCP TX buffer is empty, set Oldest_PDCP_TX_SN=Next_PDCP_TX_SN
    if Next_PDCP_TX_SN>Oldest_PDCP_TX_SN+Reordering_Window OR 0<Oldest_PDCP_TX_SN−Next_PDCP_TX_SN<=Reordering_Window (i.e., next SN is out of window)
      Insert this PDCP SDU to the temporary waiting queue (TX PDCP SN Waiting Queue).
      Exit this procedure.
    else (i.e., next SN is within window)
      if the TX PDCP SN Waiting Queue exists for this PDCP TX entity and is not empty,
        insert this PDCP SDU to the temporary PDCP SN waiting queue.
        Exit this procedure and go to TX PDCP SN Waiting Queue Handing procedure.
      associate the PDCP SN corresponding to Next_PDCP_TX_SN to this PDCP SDU;
5.x.y.z TX PDCP SN Waiting Queue Handling procedure
When this procedure is invoked, the UE shall
  if the TX PDCP SN Waiting Queue does not exist for this PDCP TX entity or is empty,
    Exit this procedure.
  check the PDCP TX buffer and find out the oldest PDCP SN still active (Oldest_PDCP_TX_SN)
    If PDCP TX buffer is empty, set Oldest_PDCP_TX_SN=Next_PDCP_TX_SN
    if Next_PDCP_TX_SN>Oldest_PDCP_TX_SN+Reordering_Window OR 0<Oldest_PDCP_TX_SN−Next_PDCP_TX_SN<=Reordering_Window (i.e., next SN is out of window)
      Exit this procedure.
    else (i.e., next SN is within window)
      retrieve a PDCP SDU from the TX PDCP SN Waiting Queue in FIFO manner
        associate the PDCP SN corresponding to Next_PDCP_TX_SN to this PDCP SDU;
        perform header compression of the PDCP SDU (if configured) as specified in the subclause 5.5.4;
      perform integrity protection (if applicable), and ciphering (if applicable) using COUNT based on TX_HFN and the PDCP SN associated with this PDCP SDU as specified in the subclause 5.7 and 5.6, respectively;
      increment Next_PDCP_TX_SN by one;
      if NextPDCP_TXSN>Maximum_PDCPSN:
        set Next_PDCP_TX_SN to 0;
        increment TX_HFN by one;
      submit the resulting PDCP Data PDU to lower layer.
    Repeat this procedure from the top until one of the exit conditions is satisfied When a TX PDCP SN Waiting Queue is used, this queue may be checked whenever any packets from the PDCP transmit buffer is cleared to use the opportunity of assigning more SNs and submitting the PDCP Data PDU to lower layer. The following box shows a representative portion of 3GPP TS 36.323 that may correspond to this embodiment.

5.4 PDCP Discard
When the discardTimer expires for a PDCP SDU, or the successful delivery of a PDCP SDU is confirmed by PDCP status report, the UE shall discard the PDCP SDU along with the corresponding PDCP PDU. If the corresponding PDCP PDU has already been submitted to lower layers the discard is indicated to lower layers. When at least one PDCP SDU is discarded, and if TX PDCP SN Waiting Queue exists and is not empty for this PDCP entity, the UE shall invoke TX PDCP SN Waiting Queue Handling procedure.

Figure 2:
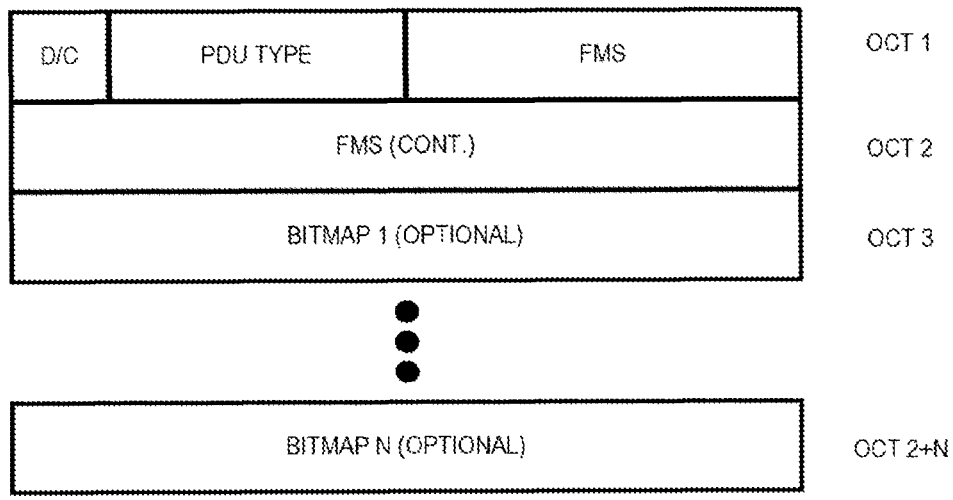
FIG. 2 is a diagram of an example PDCP Control PDU format for a PDCP status report in accordance with one or more embodiments.

Referring now to FIG. 2, a diagram of an example PDCP Control PDU format for a PDCP status report in accordance with one or more embodiments will be discussed. The report shown in FIG. 2 may be a WLAN-PDCP status report. The format of an existing PDCP status report defined in 3GPP 36.323, is shown FIG. 2. FIG. 2 shows the format of the PDCP Control PDU carrying one PDCP status report. This format is applicable for DRBs mapped on RLC AM. The same report may be used for PDCP status report for packets sent over WLAN, but a new PDU Type, for example, x010, may be used to identify the PDCP control PDU type.

Figure 3:
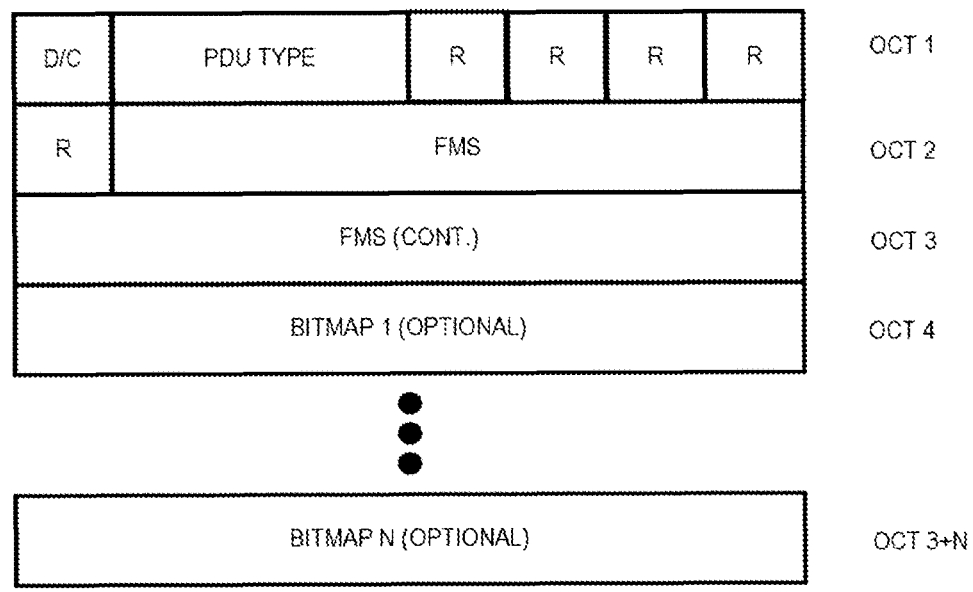
FIG. 3 is a diagram of an example PDCP Control PDU format for a PDCP status report using a 15-bit sequence number (SN) in accordance with one or more embodiments.

Referring now to FIG. 3, a diagram of an example PDCP Control PDU format for a PDCP status report using a 15-bit sequence number (SN) in accordance with one or more embodiments will be discussed. An alternate method for reporting is to transmit the SN of the last successfully received WLAN packet. The PDCP status report then may be modified to report the LAST_RECEIVED WLAN SN, a 15 bit number. One modification on existing PDCP status reports for 15 bit SN can be using one Reserved Bit, the bits marked as R FIG. 3, to indicate that this is a special PDCP status report where only the LAST_RECEIVED WLAN SN is reported and set FMS be the LAST_RECEIVED WLAN SN. Both types of formats can be supported and distinguished using different PDU types.

In one or more embodiments, the PDCP status reporting may be configured for the UE 112. The network 100 can configure the UE PDCP status reporting procedures via RRC signaling. It may set up a periodic status report or request it on demand. It may also configure the UE to send a status report after receiving N PDCP packets. As an example, the PDCP-Config Information Element may be modified as follows to enable this report. Several other variations to support the functionality easily may be defined.

```
PDCP-Config ::=                SEQUENCE {
   discardTimer                   ENUMERATED {
                                     ms50, ms100, ms150, ms300, ms500,
                                     ms750, ms1500, infinity
   }                              OPTIONAL,     -- Cond Setup
   rlc-AM                         SEQUENCE {
      statusReportRequired           BOOLEAN
      statusReportRequiredMultiRAT-r13    BOOLEAN    OPTIONAL,
      statusReport-multiRAT-r13 StatusReport-multiRAT-r13 OPTIONAL, -- Cond
multiRAT
   }                              OPTIONAL,     -- Cond Rlc-AM
   rlc-UM                         SEQUENCE {
      pdcp-SN-Size                   ENUMERATED {len7bits, len12bits}
   }                              OPTIONAL,     -- Cond Rlc-UM
StatusReport-multiRAT-r13 ::= SEQUENCE  {
   triggerType           CHOICE {
      eventID                        CHOICE {
         eventPeriodic                  SEQUENCE {
            eventPeriodicThreshold             PdcpReportInterval
         },
         eventOnDemand                  SEQUENCE {
            eventOnDemand                      BOOLEAN
         },
         eventNpackets                  SEQUENCE {
            eventNpackets-Threshold            NumUnreportedPDCP
         },
         eventNcount                    SEQUENCE {
            eventNcount-Threshold              NumUnreportedPDCPcount
         },
         ...
      }
   }
}
PdcpReportInterval::= ENUMERATED {
      ms120, ms240, ms480, ms640, ms1024, ms2048, ms5120, ms10240,
      min1, min6, min12, min30, min60, spare3, spare2, spare1}
NumUnreportedPDCP ::=     INTEGER (1..maxNumUnreportedPDCP)
NumUnreportedPDCPcount ::=        INTEGER (1..maxNumUnreportedPDCPcount)
```

| PDCP Config field descriptions |
| --- |
| statusReportRequiredMultiRAT-r13 |
| Indicates whether UE based PDCP status report is required for multi-RAT case |
| statusReport-multiRAT-r13 |
| Indicates the UE status Reporting parameters for multi-RAT scenario. |
| PdcpReportInterval |
| The PdcpReportInterval indicates the interval between periodical PDCP reports by the UE. The PdcpReportInterval is applicable if the UE performs periodical reporting. Value ms120 corresponds with 120 ms, ms240 corresponds with 240 ms and so on, while value min1 corresponds with 1 min, min6 corresponds with 6 min and so on. |
| NumUnreportedPDCP |
| Indicates the maximum number of PDCP packets received since last PDCP reporting by the UE to trigger next PDCP status reporting. Value is integer between 1 and maxNumUnreportedPDCP which can be defined based on PDCP SN length and TX size buffer, among other parameters. |
| NumUnreportedPDCPcount |
| Indicates the difference of current PDCP COUNT and PDCP COUNT at the last PDCP reporting by the UE to trigger next PDCP status reporting. This includes the PDCP holes, i.e., packets that may not have been received, and the packets sent via direct link (e.g., LTE). Value is integer between 1 and maxNumUnreportedPDCPcount which can be defined based on PDCP SN length and TX size buffer, among other parameters. |

| Conditional presence | Explanation |
| --- | --- |
| multiRAT | The field is mandatory present upon setup of a PDCP entity for a radio bearer configured with RLC AM and multi-RAT tight integration and UE based PDCP reporting required (i.e., when statusReportRequiredMultiRAT-r13 is enabled). Otherwise the field is not present. |

The above example assume that the PDCP status reporting can be triggered by one of the four conditions: (1) if configured to send report periodically; (2) if configured to send report on demand; (3) if a predefined number of PDCP packets are received by the UE since last report was sent; or (4) if the difference in PDCP COUNT between current COUNT and the COUNT at last reporting is more than a threshold, including the holes and the packets transmitted via LTE. It should be noted that these are just examples, and the actual implementation may have more conditions and/or events. Additionally, above example only covers PDCP configuration at the time of radio bearer establishment/re-establishment. It should also be possible, however, to modify these parameters by RRC signaling any time during the multi-radio aggregation operation.

Figure 4:
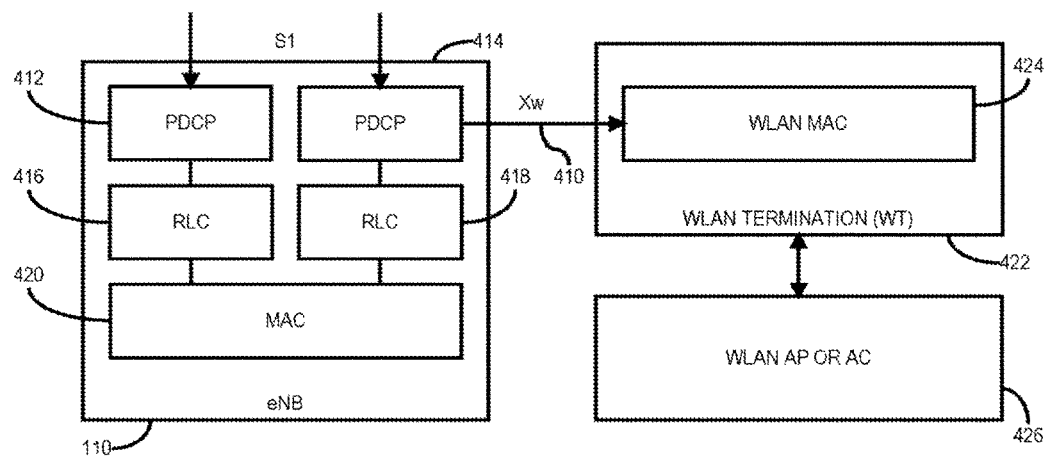
FIG. 4 is a diagram of control flow signaling over an X2-W interface in accordance with one or more embodiments.

Referring now to FIG. 4, a diagram of control flow signaling over an Xw interface in accordance with one or more embodiments will be discussed. As shown in FIG. 1, an eNB may include PDCP block 412 and 414 receiving packets over an Si interface from a mobility management entity (MME) (not shown). As shown similarly in FIG. 1, the PDCP packets may be processed by RLC block 416 and 418, and sent to MAC block 410 of eNB. If packets are to be offloaded via LTE-WLAN aggregation (LWA), packets may be offloaded to a WT 422 via an Xw interface 410 to be processed by the WLAN MAC block 424. WT 422 in turn may be connected to a WLAN access point (AP) or access controller (AC) 426. In some embodiments, UE reporting RRC signaling may be defined to support LWA. In addition to WLAN measurement reporting utilized by the eNB to decide when to activate LTE/WLAN aggregation, UE-based flow control signaling may be defined under the assumption Xw interface 410 does not support flow control.

In one or more embodiments, it may be assumed that Xw interface 410 supports at least some form of feedback and/or delivery status reporting to allow the scheduler in the eNB 110 to adjust the packet flow based on current WLAN link throughput. Simulations show that this kind of feedback may facilitate aggregation performance gains. It should be noted, however, that a standardized Xw user plane and/or control plane interface has significant WLAN AP impact and does not allow reusing existing WLAN AP install base for aggregation. In one or more embodiments, an alternative approach may be implemented based on UE feedback over the LTE air interface which allows aggregation with little to no WLAN AP impact. This may be achieved by implementing the following. Radio Resource Control (RRC) WLAN measurement configuration and reporting enhancements for aggregation may be utilized by the eNB 110 for aggregation activation, aggregation modification, and/or scheduling decisions over an LTE link instead of using WLAN. UE 112 based feedback may be utilized to report which PDCP PDUs have been received, for example for flow control, to be used by the eNB 110 for aggregation modification and scheduling over an LTE link instead of using WLAN. Such an arrangement allows implementing LTE-WLAN Aggregation (LWA) without adversely impacting the WLAN AP and without sacrificing performance by supporting feedback and flow control on the LTE air interface.

In one or more embodiments, the basic LTE/WLAN aggregation activation operation may be as follows. The eNB 110 supporting LTE/WLAN aggregation configures WLAN measurements for the UE 112 using an RRCConnectionReconfiguration message. When the UE 112 detects WLAN APs supporting aggregation for which ReportConfigInterRAT measurements are above configured thresholds, the UE 112 reports identifiers of these APs to the eNB 110. Based on this and other information, the eNB 110 activates LTE/WLAN aggregation and moves certain bearers to WLAN. Once LTE/WLAN aggregation is activated and certain bearers are using both LTE and WLAN downlink, the eNB scheduler receives periodic feedback regarding WLAN link characteristics, for example data rate, throughput, and delay, and also acknowledgment for PDCP PDUs delivered to the UE 112 via WLAN. Feedback the Xw interface 410 may be periodic, whereas UE 112 based feedback may be periodic or triggered by the eNB 110. In some embodiments, this information is available via the Xw interface 410, for example using GTP-U flow control enhancements defined in TS 36.465 "Evolved Universal Terrestrial Radio Access Network (E-UTRAN) and Wireless LAN (WLAN); Xw interface user plane protocol" for LWA. This interface, however, may not be available. Therefore, in accordance with one or more embodiments UE-based feedback over the LTE air interface is utilized to implement flow control, using either RRC signaling, for example enhanced MeasurementReport message, or in-band signaling.

In accordance with one or more embodiments, the measurement framework for LTE/WLAN aggregation may be utilized. In addition, a WLAN Modulation Coding Scheme (MCS) may be utilized, which is the average MCS of the received WLAN data frames, and WLAN/WAN metrics such as backhaul downlink and uplink rate, and a MeasurementReport message may be used to report WLAN measurements to the eNB 110. Backhaul rate is one metric utilized by the eNB 110 to decide when to activate LTE/WLAN aggregation, for example if this information is not available via the X2-W network interface 410. Such additional metrics may be added to the MeasResults IEs as follows.

```
-- ASN1START
MeasResults ::=                                 SEQUENCE {
    measId                                      MeasId,
    measResultPCell                             SEQUENCE {
        rsrpResult                                      RSRP-Range,
        rsrqResult                                      RSRQ-Range
    },
    measResultNeighCells                        CHOICE {
        measResultListEUTRA
    MeasResultListEUTRA,
        measResultListUTRA                      MeasResultListUTRA,
        measResultListGERAN
    MeasResultListGERAN,
        measResultsCDMA2000
    MeasResultsCDMA2000,
        measResultsListWLAN
    MeasResultsListWLAN,
        ...
    }
                                                OPTIONAL,
    ...,
    [[  measResultForECID-r9                    MeasResultForECID-r9
                OPTIONAL
    ]],
    [[  locationInfo-r10                        LocationInfo-r10
                OPTIONAL,
        measResultServFreqList-r10              MeasResultServFreqList-r10
OPTIONAL
    ]],
    [[  measId-v1250                            MeasId-v1250
                OPTIONAL,
        measResultPCell-v1250                   RSRQ-Range-v1250
                OPTIONAL,
        measResultCSI-RS-List-r12               MeasResultCSI-RS-List-r12
OPTIONAL
    ]]
}
MeasResultListEUTRA ::=                         SEQUENCE (SIZE (1..maxCellReport)) OF
MeasResultEUTRA
MeasResultEUTRA ::=     SEQUENCE {
    physCellId                                  PhysCellId,
    cgi-Info                                    SEQUENCE {
        cellGlobalId                                    CellGlobalIdEUTRA,
        trackingAreaCode                                TrackingAreaCode,
        plmn-IdentityList                               PLMN-IdentityList2
                OPTIONAL
    }
                        OPTIONAL,
    measResult                                  SEQUENCE {
        rsrpResult                                              RSRP-Range
                            OPTIONAL,
        rsrqResult                                              RSRQ-Range
                            OPTIONAL,
        ...,
        [[      additionalSI-Info-r9            AdditionalSI-Info-r9
                    OPTIONAL
        ]],
        [[      primaryPLMN-Suitable-r12        ENUMERATED {true}
                    OPTIONAL,
                measResult-v1250                        RSRQ-Range-v1250
                    OPTIONAL
        ]]
    }
}
MeasResultServFreqList-r10 ::=    SEQUENCE (SIZE (1..maxServCell-r10)) OF
MeasResultServFreq-r10
MeasResultServFreq-r10 ::=              SEQUENCE {
    servFreqId-r10                              ServCellIndex-r10,
    measResultSCell-r10                         SEQUENCE {
        rsrpResultSCell-r10                             RSRP-Range,
        rsrqResultSCell-r10                             RSRQ-Range
    }
                        OPTIONAL,
    measResultBestNeighCell-r10                 SEQUENCE {
        physCellId-r10                                          PhysCellId,
        rsrpResultNCell-r10                             RSRP-Range,
        rsrqResultNCell-r10                             RSRQ-Range
    }
```

```
                                    OPTIONAL,
        ...,
    [[    measResultSCell-v1250           RSRQ-Range-v1250
    OPTIONAL,
            measResultBestNeighCell-v1250 RSRQ-Range-v1250    OPTIONAL
    ]]
}
MeasResultCSI-RS-List-r12 ::=  SEQUENCE (SIZE (1..maxCellReport)) OF
MeasResultCSI-RS-r12
MeasResultCSI-RS-r12 ::=    SEQUENCE {
    measCSI-RS-Id-r12                    MeasCSI-RS-Id-r12,
    csi-RSRP-Result-r12                  CSI-RSRP-Range-r12,
    ...
}
MeasResultListUTRA ::=               SEQUENCE (SIZE (1..maxCellReport)) OF
MeasResultUTRA
MeasResultUTRA ::= SEQUENCE {
    physCellId                           CHOICE {
        fdd
    PhysCellIdUTRA-FDD,
        tdd
    PhysCellIdUTRA-TDD
    },
    cgi-Info                             SEQUENCE {
        cellGlobalId                     CellGlobalIdUTRA,
        locationAreaCode                 BIT STRING (SIZE (16))
                OPTIONAL,
        routingAreaCode                             BIT STRING (SIZE
(8))          OPTIONAL,
        plmn-IdentityList                PLMN-IdentityList2
                OPTIONAL
    }
                    OPTIONAL,
    measResult                           SEQUENCE {
        utra-RSCP                                   INTEGER (-5..91)
                OPTIONAL,
        utra-EcN0                                   INTEGER (0..49)
                        OPTIONAL,
        ...,
        [[      additionalSI-Info-r9     AdditionalSI-Info-r9
                OPTIONAL
        ]],
        [[      primaryPLMN-Suitable-r12 ENUMERATED {true}
                OPTIONAL
        ]]
    }
}
MeasResultListGERAN ::=              SEQUENCE (SIZE (1..maxCellReport)) OF
MeasResultGERAN
MeasResultGERAN ::=    SEQUENCE {
    carrierFreq                          CarrierFreqGERAN,
    physCellId                           PhysCellIdGERAN,
    cgi-Info                             SEQUENCE {
        cellGlobalId                     CellGlobalIdGERAN,
        routingAreaCode                             BIT STRING (SIZE
(8))          OPTIONAL
    }
                                         OPTIONAL,
    measResult                           SEQUENCE {
        rssi                                        INTEGER (0..63),
        ...
    }
}
MeasResultsCDMA2000 ::=              SEQUENCE {
    preRegistrationStatusHRPD            BOOLEAN,
    measResultListCDMA2000               MeasResultListCDMA2000
}
MeasResultListCDMA2000 ::=           SEQUENCE (SIZE {1..maxCellReport)) OF
MeasResultCDMA2000
MeasResultCDMA2000 ::=  SEQUENCE {
    physCellId                           PhysCellIdCDMA2000,
    cgi-Info                             CellGlobalIdCDMA2000
                    OPTIONAL,
    measResult                           SEQUENCE {
        pilotPnPhase                     INTEGER         (0..32767)
```

```
                      OPTIONAL,
    pilotStrength                    INTEGER (0..63),
    ...
  }
}
MeasResultForECID-r9 ::=    SEQUENCE {
    ue-RxTxTimeDiffResult-r9         INTEGER (0..4095),
    currentSFN-r9                    BIT STRING (SIZE (10))
}
PLMN-IdentityList2 ::=               SEQUENCE (SIZE (1..5)) OF PLMN-
Identity
AddidonalSI-Info-r9 ::=     SEQUENCE {
    csg-MemberStatus-r9              ENUMERATED {member}
        OPTIONAL,
    csg-Identity-r9                  CSG-Identity
            OPTIONAL
}
MeasResultListWLAN ::=               SEQUENCE (SIZE (1..maxCellReport)) OF
MeasResultWLAN
MeasResultWLAN ::=   SEQUENCE {
    ssid                 OCTET STRING (SIZE (1..32)),
    bssid                    OCTET STRING (SIZE (6))   OPTIONAL,
    hessid               OCTET STRING (SIZE (6))   OPTIONAL,
    channel                  INTEGER(0..2)             OPTIONAL,
    channelUtilizatioon  INTEGER (0..255)         OPTIONAL,
    beaconRSSI           INTEGER (0..255)         OPTIONAL,
    rcpi                 INTEGER (0..255)         OPTIONAL,
    rsni                     INTEGER (0..255)         OPTIONAL,
    currentMCS               INTEGER
OPTIONAL
...
}
-- ASN1STOP
```

Alternatively, another metric indicating WLAN rate other than MCS may be used. Furthermore, a Homogeneous Extended Service Set Identification (HESSID) WLAN identifier may be added in addition to the Basic Service Set Identification (BSSID) and Service Set Identification (SSID). The HESSID may be added to measurement configuration MeasObjectWLAN Information Element (IE) as follows.

another metric indicating WLAN rate other than MCS may be utilized. For example, a PDCP status reporting mechanism may be define having a new LWA PDCP Control PDU for LWA status report. The LWA PDCP status report may be sent by the UE periodically, wherein the periodicity may be configured by the eNB 110. The LWA PDCP status report also may be triggered by eNB 110 polling. The LWA PDCP Control PDU may carry the following information: the first

```
-- ASN1START
-- ASN1START
MeasObjectWLAN ::=           SEQUENCE {
    channel                  WLANChannel        OPTIONAL,
    ssidsToRemoveList        CellIndexList      OPTIONAL,
    ssidsToAddModList            SSIDsToAddModList OPTIONAL,
}
SSIDsToAddModList ::= SEQUENCE (SIZE (1..maxCellMeas)) OF SSIDsToAddMod
SSIDsToAddMod ::=            SEQUENCE {
    cellIndex                    INTEGER (1..maxCellMeas),
    ssid                     SSID OPTIONAL,
    bssid                        BSSID          OPTIONAL,
    hessid               BSSID     OPTIONAL
}
SSID ::=             OCTET STRING (SIZE (32))
BSSID ::=            BIT STRING (SIZE (48))
-- ASN1STOP
```

Figure 5:
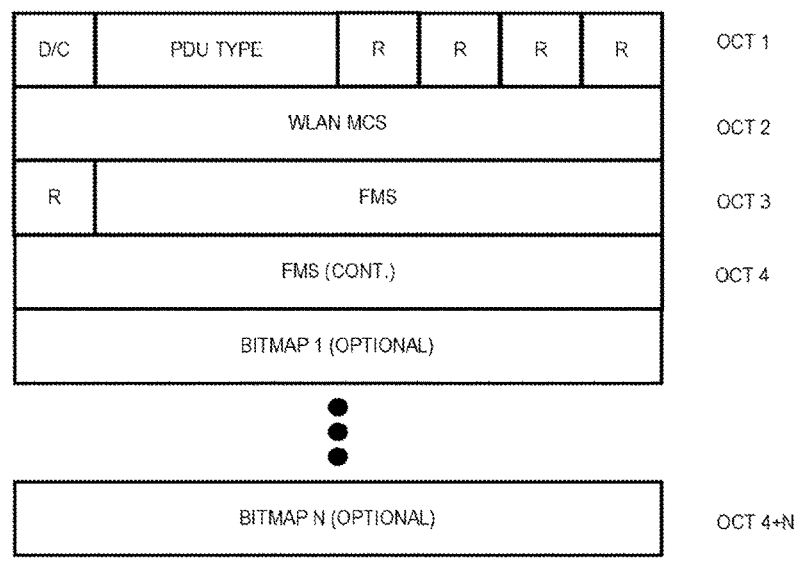
FIG. 5 is a diagram of a wireless local area network (WLAN) PDCP Control PDU format for a PDCP status report using a 15-bit sequence number (SN) in accordance with one or more embodiments.

Referring now to FIG. 5, a diagram of a wireless local area network (WLAN) PDCP Control PDU format for a PDCP status report using a 15-bit sequence number (SN) as one example in accordance with one or more embodiments will be discussed. It should be noted that a 15-bit is merely one example, and other numbers of bits may be used such as 12-bit or 18-bit variants, and the scope of the claimed subject matter is not limited in this respect. In order to implement efficient scheduling algorithm, the eNB 110 may obtain knowledge of PDCP status and WLAN modulation and coding scheme (MCS) very frequently. Alternatively, Missing PDCP SN, the highest successfully received PDCP SN on LTE link, the highest successfully received PDCP SN on WLAN link, and/or the number of missing PDCP PDUs. A UE 112 supporting LWA will also support LWA PDCP status reporting. A legacy PDCP status report also may be used for LWA. The eNB 110 may configure the UE 112 to send a legacy PDCP status report, a new LWA PDCP status report, or no report. In order to optimize the reporting process, in-band reporting using PDCP may be utilized. According to 3GPP TS 36.323, the UE 110 sends the PDCP status report indicating which PDCP PDUs have been received only upon reestablishment of the PDCP entity and upon PDCP data recovery. In accordance with one or more embodiments, PDCP status reporting may be enhanced in order to support feedback for LTE/WLAN aggregation (LWA).

The UE 112 supporting LTE-WLAN aggregation may to send a PDCP status report not only in the cases mentioned above, but also during normal operation. In such an arrangement, when to send the PDCP status report may be left for implementation by the UE 112 or configured by the network 100, so that the UE 112 sends PDCP status reports periodically or based on network configuration. The configuration may include time period to send the report periodically, time elapsed since last missing PDCP PDU, that is the last PDCP received out of order, and other information. RRC signaling, for example using a PDCP-Config Information Element (IE), may be enhanced to convey the configuration information for PDCP status reporting. In addition, the format of the PDCP status report message may be enhanced. In one or more embodiments, the existing PDCP report message may be extended, or a new PDCP control messages may be defined for this purpose. One embodiment in which a new WLAN PDCP status reporting message is defined is shown in and described with respect to FIG. 5. FIG. 5 shows the format of the WLAN PDCP Control PDU carrying one PDCP status report when a 15 bit SN length is used.

Figure 6:
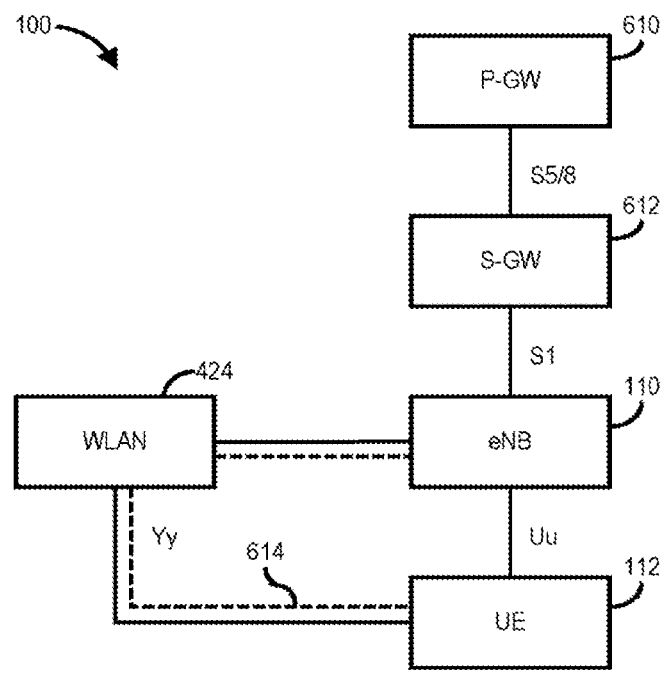
FIG. 6 is a diagram of a RAN-based WLAN/3GPP integrated network architecture in accordance with one or more embodiments.

Referring now to FIG. 6, a diagram of a RAN-based WLAN/3GPP integrated network architecture in accordance with one or more embodiments will be discussed. FIG. 6 illustrates one embodiment for realizing a 3GPP RAN anchored WLAN. Network 100 may include a packet data network gateway (P-GW) 610, a serving gateway (S-GW) 612, eNB 110, UE 112, and WLAN AP 424. As shown in FIG. 6, the Yy interface 614 is a point-to-point (P2P) link between the UE 112 and eNB 110 for routing traffic to and from the UE 112 via a WLAN AP 424. One consideration is at which layer on the protocol stack the bearer splitting operation should takes place. In some embodiments, a bearer such as a Data Radio Bearer may be split over both WLAN and LTE at or above PDCP, inside PDCP, or below PDCP.

One commonality for the PDCP-based solutions is that the PDCP Sequence Number may be utilized for splitting and reordering of packets. The length of the PDCP Sequence Number, however, may be limited, for example up to 15 bits, and therefore if the transmitter is sending too fast so that sequence number wraps around, the receiver may have difficulty to identify the order of a packet.

For example, assume that the PDCP Sequence Number field is three bits so that the maximum number of packets with unique PDCP SNs is eight. Whenever the PDCP SN reaches eight, the digits will wrap around and restart from zero. As a result, if the transmitter sends out more than eight packets, the receiver will have difficulty identifying the actual sequence number of the packet. This problem may be referred to as Hyper Frame Number (HFN) desynchronization. Currently, addressing HFN desynchronization is left up to UE implementation. In accordance with one or more embodiments, HFN desynchronization may be addressed in radio access network (RAN) based WLAN/3GPP integration in network 100, for example as shown in and described with respect to FIG. 7, below.

Figure 7:
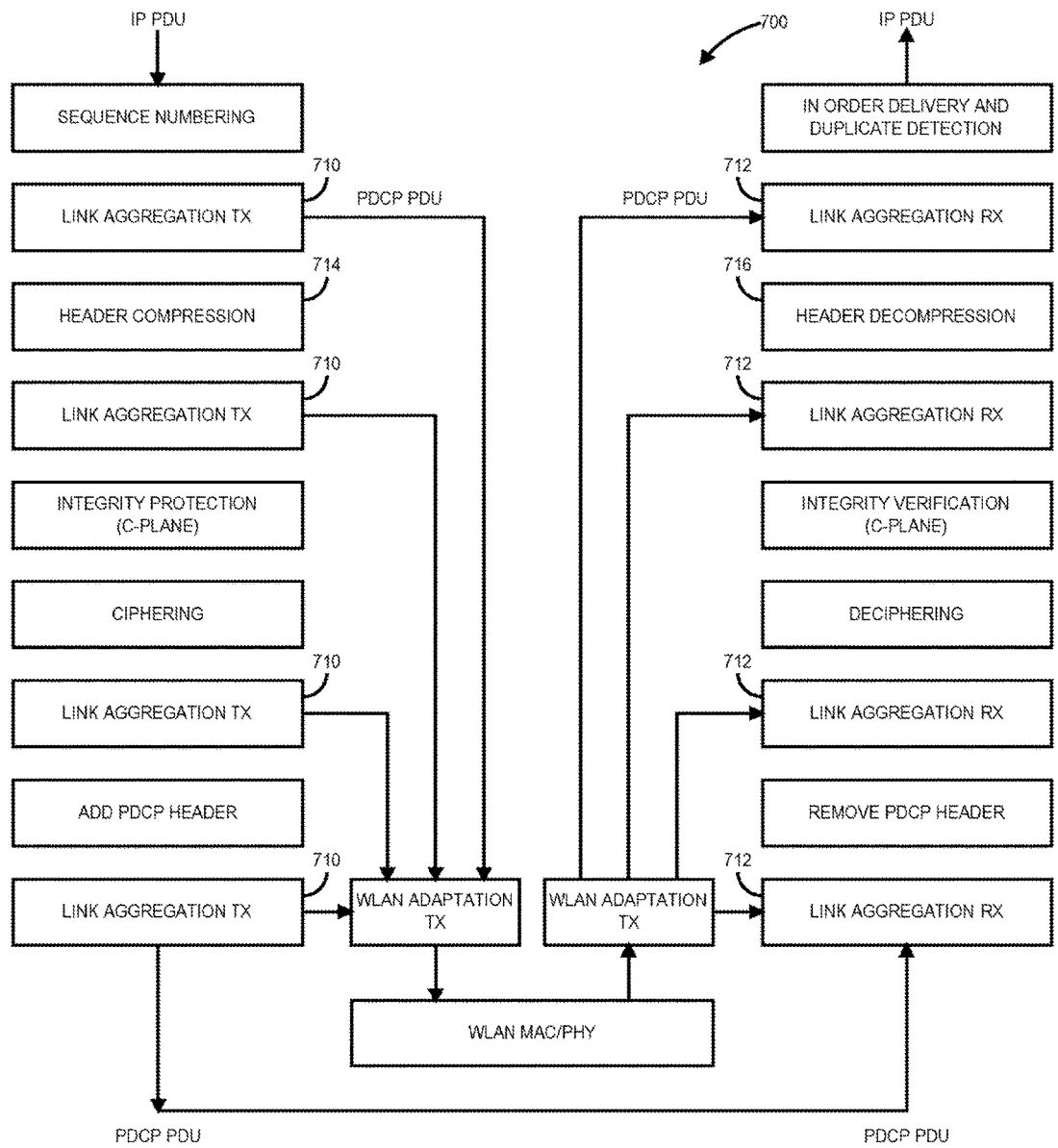
FIG. 7 is a diagram of an enhanced PDCP protocol stack with WLAN/3GPP link integration in accordance with one or more embodiments.

Referring now to FIG. 7, a diagram of an enhanced PDCP protocol stack with WLAN/3GPP link integration in accordance with one or more embodiments will be discussed. FIG. 7 shows one example of PDCP-based Link Aggregation protocol stack 700, in which a new Link Aggregation function may be added at different layers of PDCP. In addition, a WLAN adaptation transmission (TX) and reception (RX) layer may handles all additional protocols, for example encryption, header compression, encapsulation, tunneling, and so on, for the PDUs delivered over the WLAN link.

In accordance with one or more embodiments, Link Aggregation TX blocks 710 may be aware of the sequence number (SN) of the first packet and or the first missing packet in the reordering window at the Link Aggregation RX blocks 712, and may maintain a sliding transmission window to control how many PDCP packets may be transmitted without being acknowledged.

In one or more embodiments, the following state variables may be defined.

First Missing SN (FMS): indicates the first (first missing) packet in the reordering window at the Link Aggregation RX blocks 712

W: indicates the reordering window size at the Link Aggregation RX blocks 712, and also the transmit window size at the Link Aggregation TX block 710

S: indicates the maximum Sequence Number, and when the SN reaches a value of S, it will wrap around and restart from a value of zero Reordering Timeout (t-Reordering): indicate the maximum time of a packet will wait for reordering at a Link Aggregation RX block 712

It may be assumed that both the Link Aggregation TX blocks 712 and the Link Aggregation RX blocks have the a priori knowledge of W, S, and t-Reordering. In one or more embodiments, the objective is to let Link Aggregation TX blocks 710 gain the knowledge of FMS, which only may be available at Link Aggregation RX blocks.

One or more embodiments may be directed to Cross-Layer based PDCP Flow Control. In this embodiment, the Link Aggregation TX block 710 in the Enhanced PDCP layer will get the status, namely success or failure, for each PDCP PDU transmission from the lower layer function, for example WLAN RLC or LTE RLC, and then update FMS itself. The PDCP PDU format for WLAN may vary depending on where the Link Aggregation functions operate in the PDCP layer. For example, if the Link Aggregation functions (TX or RX) operate on top of the Header Compression function 714 or Header Decompression functions 716, the PDCP PDU simply will be the Internet Protocol (IP) packet.

The Link Aggregation TX blocks 710 will keep a Link Aggregation t-Reordering timer which will restart for each successfully transmitted PDCP PDU, so that FMS may be updated when the timer expires. Thus, the Link Aggregation t-Reordering timer controls how long a packet may wait after being successfully received by a Link Aggregation RX block 712. In summary, FMS will update, and the sliding transmission window will move forward if any of the following events occurs: Confirmation of successful TX of the PDU with its SN equal to FMS; Confirmation of non-successful TX of the PDU with its SN equal to FMS, and no further retransmission attempt; or t-Reordering timer expiry. The Link Aggregation TX function block 710 will only send a new packet if its SN falls in the range of transmit window, that is [FMS, FMS+W]. Otherwise, the Link Aggregation TX function block 710 wait for the FMS update.

Figure 8:
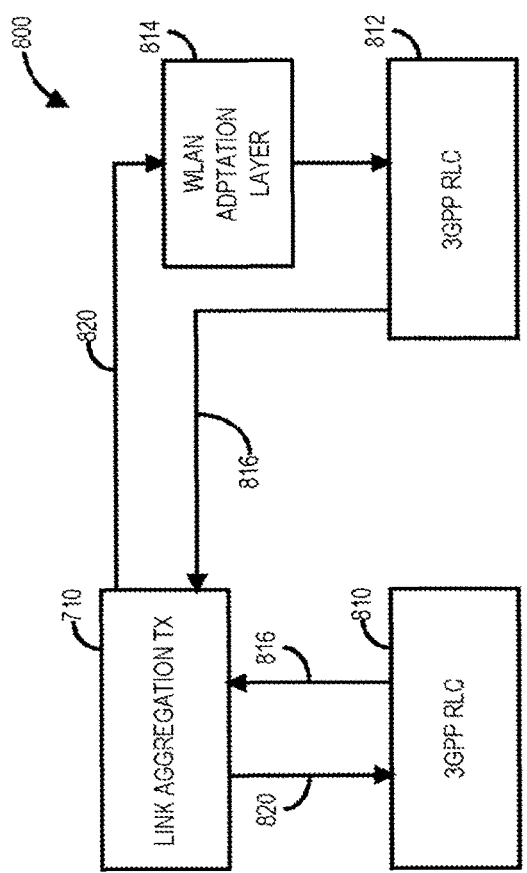
FIG. 8 is a cross-layer based PDCP flow control diagram in accordance with one or more embodiments.

Referring now to FIG. 8, a cross-layer based PDCP flow control diagram in accordance with one or more embodiments will be discussed. FIG. 8 shows an example cross-layer based PDCP flow control diagram 800 comprising a Link Aggregation TX block 710, 3GPP radio link control (RLC) block 810, WLAN media access control (MAC) block 812, and WLAN adaptation layer 814. The TX confirmation signals 816 from 3GPP RLC block 3GPP RLC block 810 and WLAN MAC block 812 may include the following information:

SN: sequence number of the packet

TX Status: success or failure

Timestamp: the time when the transmission is successfully acknowledged.

Note that if the acknowledgement or un-acknowledgement is falsely generated by the lower layer protocol, for example with Hybrid automatic repeat request (HARQ), radio link control (RLC), and so on, the following two scenarios may be considered.

False ACK: the Link Aggregation TX will consider the PDCP PDU 820 as successfully acknowledged, although the Link Aggregation RX block 712 doesn't receive it. As a result, the Link Aggregation TX block 710 will update FMS and move the transmit window forward, while the Link Aggregation RX block 712 will keep waiting for the missing PDCP PDU 820 until the t-Reordering timer expires. During this period, TX and RX is out of sync, and the Hyper Frame Number (HFN) desynchronization problem may happen because the TX window is ahead of the RX window.

False NACK: the Link Aggregation TX block 710 will consider the PDCP PDU 820 as failure, although the Link Aggregation RX block 712 does receive it. As a result, the Link Aggregation TX block 710 will not update FMS until the retransmission is successful or the r-Reordering timer expires, while the Link Aggregation RX block 712 will update the FMS and move the transmit window forward. During this period, TX and RX is out of sync, but the HFN desynchronization problem will not happen because the TX window is behind the RX window.

The HFN desynchronization problem due to a False ACK situation may be mitigated by limiting t-Reordering timer such that the timer will expire before the Link Aggregation TX block 710 reaches the end of the RX window. Let X be used to indicate the maximum allowable throughput in the unit of PDCP PDUs 820 per second. As a result:

$$t\text{-Reordering} < W/X$$

In one or more embodiments, X may be estimated based on LTE categories that define the Max Throughput and the IP maximum transmission unit (MTU), assuming an application will not send at high data rate a series of small IP data, as well as WLAN maximum data rate, or/and UE subscription information, for quality of service (QoS) and/or QoS class identifier (QCI) parameters. Moreover, the eNB 110 may send explicit control messages, for example radio resource control (RRC), to the UE 112 for configuring the Link Aggregation t-Reordering timer.

In one or more embodiments, another solution to avoid "HFN desynchronization" without the "False ACK (NACK)" problem will be described using feedback based PDCP flow control. In such embodiments, the Link Aggregation RX block 712 will explicitly report the FMS information to the Link Aggregation TX block using the PDCP control PDU for a PDCP status report, or using other methods, for example a MAC control header, and so on. To minimize the signaling overhead, the following trigger conditions for FMS feedback may be defined:

one report every N (transmitted, or received) packets one report every t milliseconds (ms)

Moreover, a FMS feedback may be skipped if the FMS has not changed since the last feedback. A diagram of an example feedback based PDCP flow is shown in and described with respect to FIG. 9, below.

Figure 9:
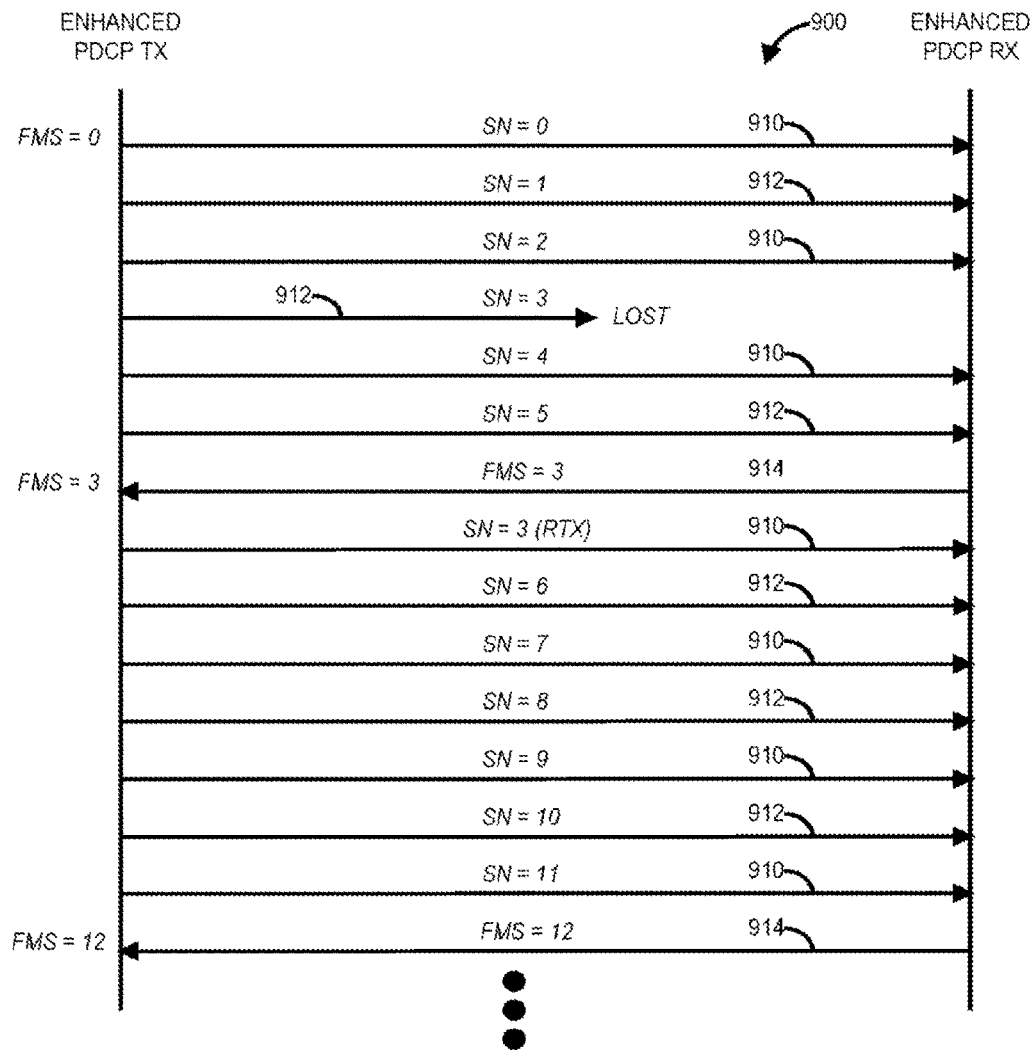
FIG. 9 is a diagram of feedback based PDCP flow control in accordance with one or more embodiments.

Referring now to FIG. 9, a diagram of feedback based PDCP flow control in accordance with one or more embodiments will be discussed. FIG. 9 shows an example how the feedback based PDCP flow control 900 operates. In one or more embodiments, a 50% splitting ratio may be assumed between WLAN and LTE with cross-RAT retransmission. PDCP data transmitted over 3GPP/LTE are labeled as 910. PDCP data transmitted over WLAN are labeled as 912. FMS feedback over 3GPP is labeled as 914. As shown in FIG. 9, Packet number 3 may be lost over WLAN, and retransmitted over LTE. Also, the FMS feedback may be configured to be triggered every six transmitted packets, although the scope of the claimed subject matter is not limited in this respect. It should be noted that PDCP status report control PDU can report not only the first missing packet, but also the following missing packets by including a bitmap field. With the FMS feedback 914, the Link Aggregation TX 710 can always stay in sync with the Link Aggregation RX 712, eliminating the possibility of a False ACK or a False NACK, although the scope of the claimed subject matter is not limited in these respects Referring now to FIG. 10, a block diagram of an information handling system capable of PDCP status reporting for multi-RAT offloading in accordance with one or more embodiments will be discussed. Information handling system 1000 of FIG. 10 may tangibly embody any one or more of the network elements described herein, above, including for example the elements of network 100 of FIG. 1, FIG. 4, FIG. 6, of FIG. 8, and so on, with greater or fewer components depending on the hardware specifications of the particular device. In one example, information handling system 1000 may tangibly embody a user equipment (UE) comprising circuitry to receive data transmissions as packet data convergence protocol (PDCP) packets from a radio bearer via two or more Radio Access Technologies (RATs), wherein one or more PDCP packets are offloaded from a first RAT to a second RAT. aggregate the received data PDCP packets, and report a status of the PDCP packets to the radio bearer, although the scope of the claimed subject matter is not limited in this respect. In another example, information handling system 1000 may tangibly embody an evolved Node (eNodeB) comprising circuitry to transmit data as packet data convergence protocol (PDCP) packets for transmissions via two or more Radio Access Technologies (RATs), wherein one or more PDCP packets are offloaded from a first RAT to a second RAT, send a message to a receiver of the PDCP packets one or more parameters for PDCP reporting, and receive a status report of the PDCP packets from the receiver of the PDCP packets, although the scope of the claimed subject matter is not limited in this respect. Although information handling system 1000 represents one example of several types of computing platforms, information handling system 1000 may include more or fewer elements and/or different arrangements of elements than shown in FIG. 10, and the scope of the claimed subject matter is not limited in these respects.

In one or more embodiments, information handling system 1000 may include an application processor 1010 and a baseband processor 1012. Application processor 1010 may be utilized as a general-purpose processor to run applications and the various subsystems for information handling system 1000. Application processor 1010 may include a single core or alternatively may include multiple processing cores. One or more of the cores may comprise a digital signal processor or digital signal processing (DSP) core.

Furthermore, application processor 1010 may include a graphics processor or coprocessor disposed on the same chip, or alternatively a graphics processor coupled to application processor 1010 may comprise a separate, discrete graphics chip. Application processor 1010 may include on board memory such as cache memory, and further may be coupled to external memory devices such as synchronous dynamic random access memory (SDRAM) 1014 for storing and/or executing applications during operation, and NAND flash 1016 for storing applications and/or data even when information handling system 1000 is powered off. In one or more embodiments, instructions to operate or configure the information handling system 1000 and/or any of its components or subsystems to operate in a manner as described herein may be stored on an article of manufacture comprising a non-transitory storage medium. In one or more embodiments, the storage medium may comprise any of the memory devices shown in and described herein, although the scope of the claimed subject matter is not limited in this respect. Baseband processor 1012 may control the broadband radio functions for information handling system 1000. Baseband processor 1012 may store code for controlling such broadband radio functions in a NOR flash 1018. Baseband processor 1012 controls a wireless wide area network (WWAN) transceiver 1020 which is used for modulating and/or demodulating broadband network signals, for example for communicating via a 3GPP LTE or LTE-Advanced network or the like.

In general, WWAN transceiver 1020 may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 12), 3GPP Rel. 14 (3rd Generation Partnership Project Release 12), 3GPP LTE Extra, LTE Licensed-Assisted Access (LAA), UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, millimeter wave (mm-Wave) standards in general for wireless systems operating at 10-90 GHz and above such as WiGig, IEEE 802.11ad, IEEE 802.11ay, and so on, and/or general telemetry transceivers, and in general any type of RF circuit or RFI sensitive circuit. It should be noted that such standards may evolve over time, and/or new standards may be promulgated, and the scope of the claimed subject matter is not limited in this respect.

The WWAN transceiver 1020 couples to one or more power amps 1042 respectively coupled to one or more antennas 1024 for sending and receiving radio-frequency signals via the WWAN broadband network. The baseband processor 1012 also may control a wireless local area network (WLAN) transceiver 1026 coupled to one or more suitable antennas 1028 and which may be capable of communicating via a Wi-Fi, Bluetooth®, and/or an amplitude modulation (AM) or frequency modulation (FM) radio standard including an IEEE 802.11 a/b/g/n standard or the like. It should be noted that these are merely example implementations for application processor 1010 and baseband processor 1012, and the scope of the claimed subject matter is not limited in these respects. For example, any one or more of SDRAM 1014, NAND flash 1016 and/or NOR flash 1018 may comprise other types of memory technology such as magnetic memory, chalcogenide memory, phase change memory, or ovonic memory, and the scope of the claimed subject matter is not limited in this respect.

In one or more embodiments, application processor 1010 may drive a display 1030 for displaying various information or data, and may further receive touch input from a user via a touch screen 1032 for example via a finger or a stylus. An ambient light sensor 1034 may be utilized to detect an amount of ambient light in which information handling system 1000 is operating, for example to control a brightness or contrast value for display 1030 as a function of the intensity of ambient light detected by ambient light sensor 1034. One or more cameras 1036 may be utilized to capture images that are processed by application processor 1010 and/or at least temporarily stored in NAND flash 1016. Furthermore, application processor may couple to a gyroscope 1038, accelerometer 1040, magnetometer 1042, audio coder/decoder (CODEC) 1044, and/or global positioning system (GPS) controller 1046 coupled to an appropriate GPS antenna 1048, for detection of various environmental properties including location, movement, and/or orientation of information handling system 1000. Alternatively, controller 1046 may comprise a Global Navigation Satellite System (GNSS) controller. Audio CODEC 1044 may be coupled to one or more audio ports 1050 to provide microphone input and speaker outputs either via internal devices and/or via external devices coupled to information handling system via the audio ports 1050, for example via a headphone and microphone jack. In addition, application processor 1010 may couple to one or more input/output (I/O) transceivers 652 to couple to one or more I/O ports 1054 such as a universal serial bus (USB) port, a high-definition multimedia interface (HDMI) port, a serial port, and so on. Furthermore, one or more of the I/O transceivers 1052 may couple to one or more memory slots 1056 for optional removable memory such as secure digital (SD) card or a subscriber identity module (SIM) card, although the scope of the claimed subject matter is not limited in these respects.

Figure 10:
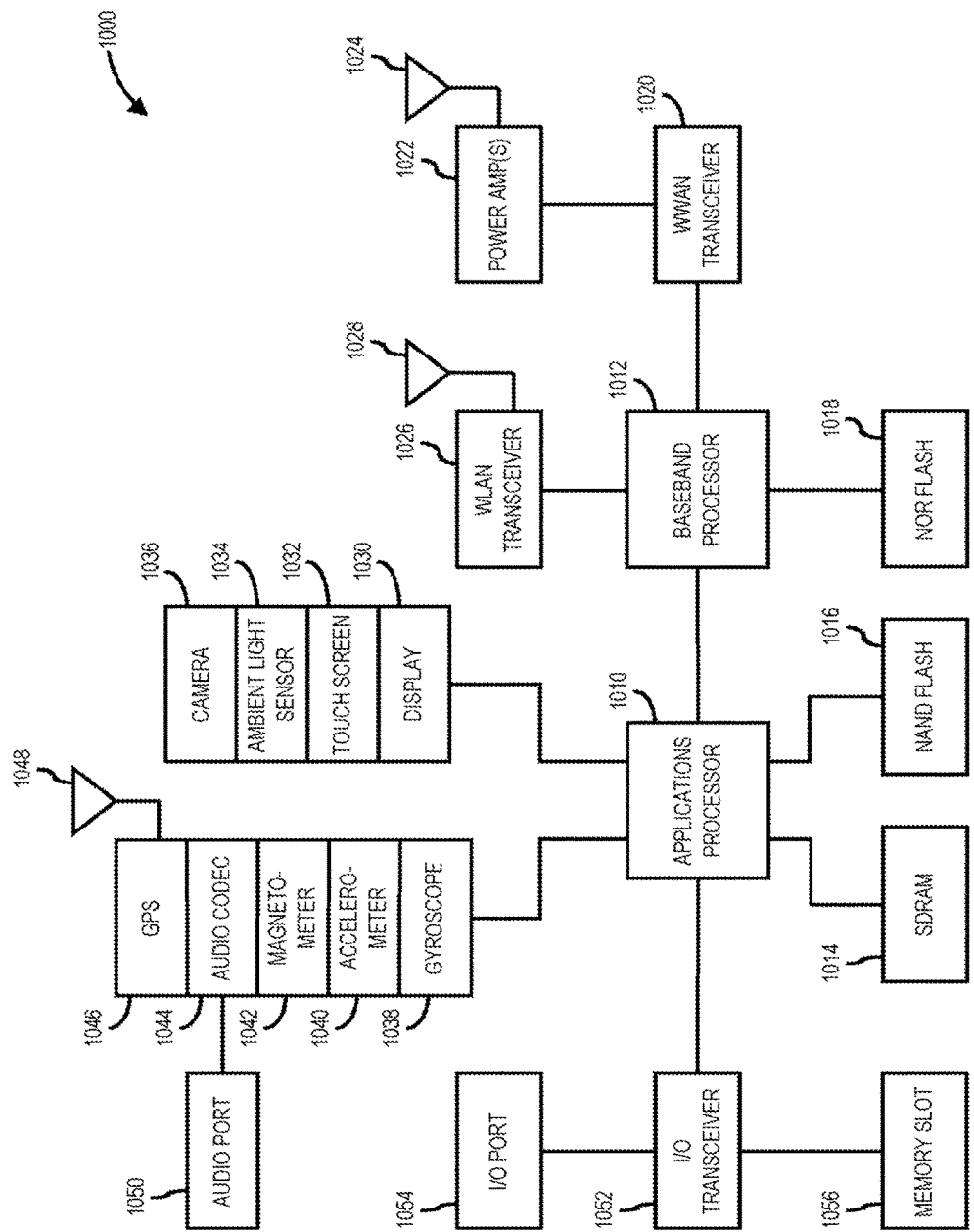
FIG. 10 is a block diagram of an information handling system capable of PDCP status reporting for multi-RAT offloading in accordance with one or more embodiments.
Figure 11:
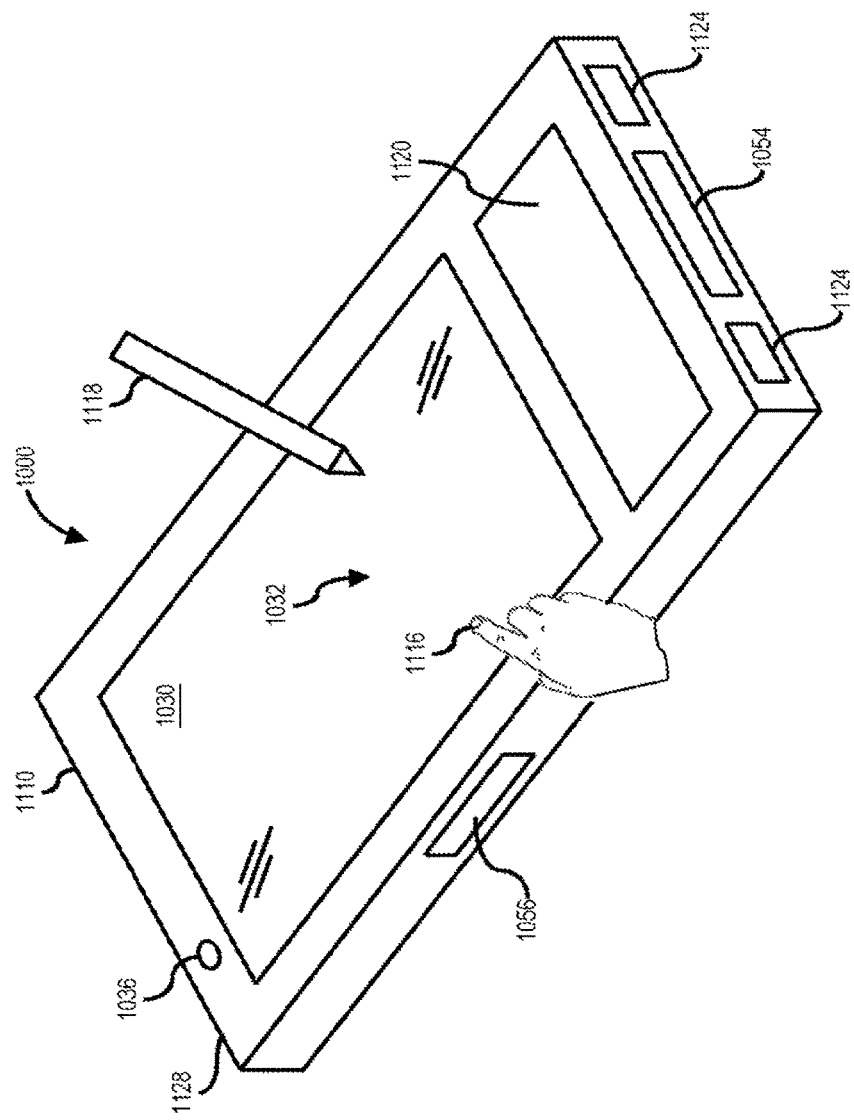
FIG. 11 is an isometric view of an information handling system of FIG. 10 that optionally may include a touch screen in accordance with one or more embodiments.

Referring now to FIG. 11, an isometric view of an information handling system of FIG. 10 that optionally may include a touch screen in accordance with one or more embodiments will be discussed. FIG. 11 shows an example implementation of information handling system 1000 of FIG. 10 tangibly embodied as a cellular telephone, smartphone, or tablet type device or the like. The information handling system 1000 may comprise a housing 1110 having a display 1030 which may include a touch screen 1032 for receiving tactile input control and commands via a finger 1116 of a user and/or a via stylus 1118 to control one or more application processors 1010. The housing 1110 may house one or more components of information handling system 1000, for example one or more application processors 1010, one or more of SDRAM 1014, NAND flash 1016, NOR flash 1018, baseband processor 1012, and/or WWAN transceiver 1020. The information handling system 1000 further may optionally include a physical actuator area 1120 which may comprise a keyboard or buttons for controlling information handling system via one or more buttons or switches. The information handling system 1000 may also include a memory port or slot 1056 for receiving non-volatile memory such as flash memory, for example in the form of a secure digital (SD) card or a subscriber identity module (SIM) card. Optionally, the information handling system 1000 may further include one or more speakers and/or microphones 1124 and a connection port 1054 for connecting the information handling system 1000 to another electronic device, dock, display, battery charger, and so on. In addition, information handling system 1000 may include a headphone or speaker jack 1128 and one or more cameras 1036 on one or more sides of the housing 1110. It should be noted that the information handling system 1000 of FIG. 11 may include more or fewer elements than shown, in various arrangements, and the scope of the claimed subject matter is not limited in this respect.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 12:
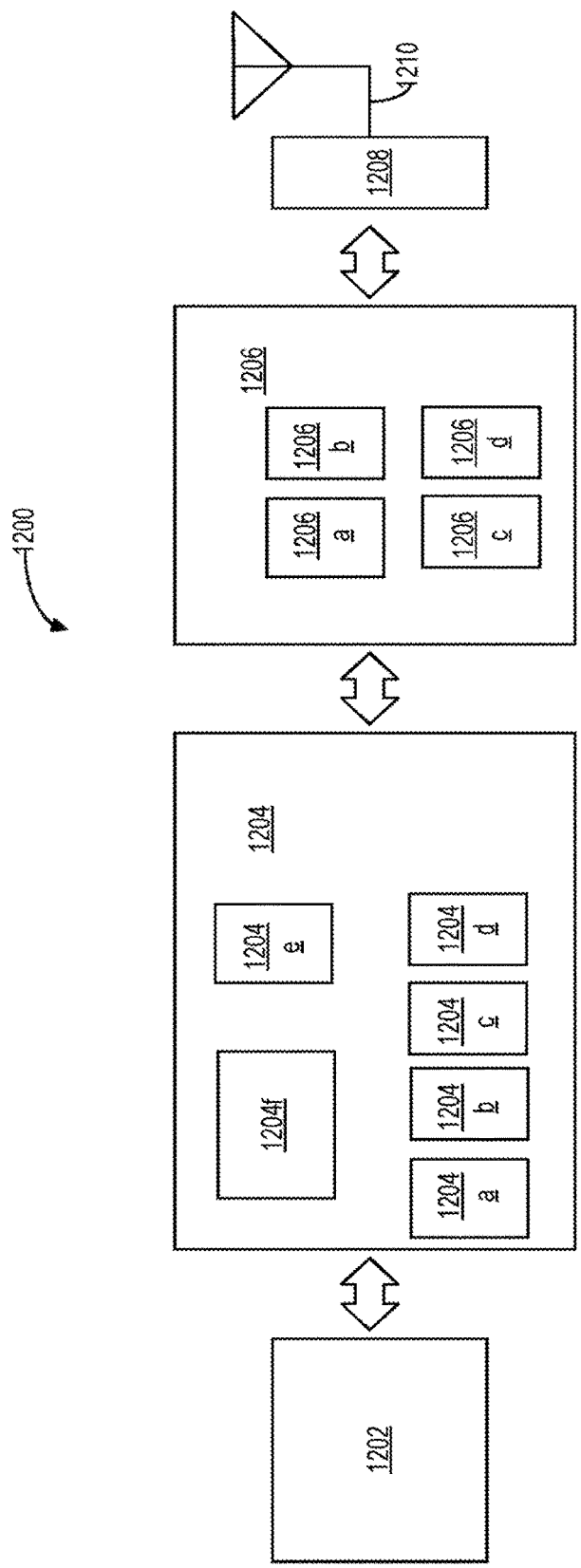
FIG. 12 is a diagram of example components of a wireless device in accordance with one or more embodiments.

Referring now to FIG. 12, example components of a wireless device such as User Equipment (UE) device 1200 in accordance with one or more embodiments will be discussed. User equipment (UE) may correspond, for example, to UE 112 of FIG. 1 or FIG. 6, although the scope of the claimed subject matter is not limited in this respect. In some embodiments, UE device 1200 may include application circuitry 1202, baseband circuitry 1204, Radio Frequency (RF) circuitry 1206, front-end module (FEM) circuitry 1208 and one or more antennas 1210, coupled together at least as shown.

Application circuitry 1202 may include one or more application processors. For example, application circuitry 1202 may include circuitry such as, but not limited to, one or more single-core or multi-core processors. The one or more processors may include any combination of general-purpose processors and dedicated processors, for example graphics processors, application processors, and so on. The processors may be coupled with and/or may include memory and/or storage and may be configured to execute instructions stored in the memory and/or storage to enable various applications and/or operating systems to run on the system.

Baseband circuitry 1204 may include circuitry such as, but not limited to, one or more single-core or multi-core processors. Baseband circuitry 1204 may include one or more baseband processors and/or control logic to process baseband signals received from a receive signal path of RF circuitry 1206 and to generate baseband signals for a transmit signal path of the RF circuitry 1206. Baseband processing circuity 1204 may interface with the application circuitry 1202 for generation and processing of the baseband signals and for controlling operations of the RF circuitry 1206. For example, in some embodiments, the baseband circuitry 1204 may include a second generation (2G) baseband processor 1204a, third generation (3G) baseband processor 1204b, fourth generation (4G) baseband processor 1204c, and/or one or more other baseband processors 1204d for other existing generations, generations in development or to be developed in the future, for example fifth generation (5G), sixth generation (6G), and so on. Baseband circuitry 1204, for example one or more of baseband processors 1204a through 1204d, may handle various radio control functions that enable communication with one or more radio networks via RF circuitry 1206. The radio control functions may include, but are not limited to, signal modulation and/or demodulation, encoding and/or decoding, radio frequency shifting, and so on. In some embodiments, modulation and/or demodulation circuitry of baseband circuitry 1204 may include Fast-Fourier Transform (FFT), precoding, and/or constellation mapping and/or demapping functionality. In some embodiments, encoding and/or decoding circuitry of baseband circuitry 804 may include convolution, tail-biting convolution, turbo, Viterbi, and/or Low Density Parity Check (LDPC) encoder and/or decoder functionality. Embodiments of modulation and/or demodulation and encoder and/or decoder functionality are not limited to these examples and may include other suitable functionality in other embodiments.

In some embodiments, baseband circuitry 1204 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. Processor 1204e of the baseband circuitry 1204 may be configured to run elements of the protocol stack for signaling of the PHY, MAC, RLC, PDCP and/or RRC layers. In some embodiments, the baseband circuitry may include one or more audio digital signal processors (DSP) 1204f. The one or more audio DSPs 1204f may include elements for compression and/or decompression and/or echo cancellation and may include other suitable processing elements in other embodiments. Components of the baseband circuitry may be suitably combined in a single chip, a single chipset, or disposed on a same circuit board in some embodiments. In some embodiments, some or all of the constituent components of baseband circuitry 1204 and application circuitry 1202 may be implemented together such as, for example, on a system on a chip (SOC).

In some embodiments, baseband circuitry 1204 may provide for communication compatible with one or more radio technologies. For example, in some embodiments, baseband circuitry 1204 may support communication with an evolved universal terrestrial radio access network (EU-TRAN) and/or other wireless metropolitan area networks (WMAN), a wireless local area network (WLAN), a wireless personal area network (WPAN). Embodiments in which baseband circuitry 804 is configured to support radio communications of more than one wireless protocol may be referred to as multi-mode baseband circuitry.

RF circuitry 1206 may enable communication with wireless networks using modulated electromagnetic radiation through a non-solid medium. In various embodiments, RF circuitry 1206 may include switches, filters, amplifiers, and so on, to facilitate the communication with the wireless network. RF circuitry 1206 may include a receive signal path which may include circuitry to down-convert RF signals received from FEM circuitry 1208 and provide baseband signals to baseband circuitry 804. RF circuitry 1206 may also include a transmit signal path which may include circuitry to up-convert baseband signals provided by the baseband circuitry 1204 and provide RF output signals to FEM circuitry 808 for transmission.

In some embodiments, RF circuitry 1206 may include a receive signal path and a transmit signal path. The receive signal path of RF circuitry 1206 may include mixer circuitry 1206a, amplifier circuitry 1206b and filter circuitry 1206c. The transmit signal path of RF circuitry 1206 may include filter circuitry 1206c and mixer circuitry 1206a. RF circuitry 1206 may also include synthesizer circuitry 1206d for synthesizing a frequency for use by the mixer circuitry 1206a of the receive signal path and the transmit signal path. In some embodiments, the mixer circuitry 1206a of the receive signal path may be configured to down-convert RF signals received from FEM circuitry 1208 based on the synthesized frequency provided by synthesizer circuitry 1206d. Amplifier circuitry 1206b may be configured to amplify the down-converted signals and the filter circuitry 1206c may be a low-pass filter (LPF) or band-pass filter (BPF) configured to remove unwanted signals from the down-converted signals to generate output baseband signals. Output baseband signals may be provided to baseband circuitry 1204 for further processing. In some embodiments, the output baseband signals may be zero-frequency baseband signals, although this is not a requirement. In some embodiments, mixer circuitry 1206a of the receive signal path may comprise passive mixers, although the scope of the embodiments is not limited in this respect.

In some embodiments, mixer circuitry 1206a of the transmit signal path may be configured to up-convert input baseband signals based on the synthesized frequency provided by synthesizer circuitry 1206d to generate RF output signals for FEM circuitry 1208. The baseband signals may be provided by the baseband circuitry 1204 and may be filtered by filter circuitry 1206c. Filter circuitry 1206c may include a low-pass filter (LPF), although the scope of the embodiments is not limited in this respect.

In some embodiments, mixer circuitry 1206a of the receive signal path and the mixer circuitry 1206a of the transmit signal path may include two or more mixers and may be arranged for quadrature down conversion and/or up conversion respectively. In some embodiments, mixer circuitry 1206a of the receive signal path and the mixer circuitry 1206a of the transmit signal path may include two or more mixers and may be arranged for image rejection, for example Hartley image rejection. In some embodiments, mixer circuitry 1206a of the receive signal path and the mixer circuitry 1206a may be arranged for direct down conversion and/or direct up conversion, respectively. In some embodiments, mixer circuitry 1206a of the receive signal path and mixer circuitry 1206a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, RF circuitry 1206 may include analog-to-digital converter (ADC) and digital-to-analog converter (DAC) circuitry, and baseband circuitry 804 may include a digital baseband interface to communicate with RF circuitry 806. In some dual-mode embodiments, separate radio integrated circuit (IC) circuitry may be provided for processing signals for one or more spectra, although the scope of the embodiments is not limited in this respect.

In some embodiments, synthesizer circuitry 1206d may be a fractional-N synthesizer or a fractional N/N+1 synthesizer, although the scope of the embodiments is not limited in this respect as other types of frequency synthesizers may be suitable. For example, synthesizer circuitry 1206d may be a delta-sigma synthesizer, a frequency multiplier, or a synthesizer comprising a phase-locked loop with a frequency divider.

Synthesizer circuitry 1206d may be configured to synthesize an output frequency for use by mixer circuitry 1206a of RF circuitry 1206 based on a frequency input and a divider control input. In some embodiments, synthesizer circuitry 1206d may be a fractional N/N+1 synthesizer.

In some embodiments, frequency input may be provided by a voltage controlled oscillator (VCO), although that is not a requirement. Divider control input may be provided by either baseband circuitry 1204 or applications processor 1202 depending on the desired output frequency. In some embodiments, a divider control input (e.g., N) may be determined from a look-up table based on a channel indicated by applications processor 1202.

Synthesizer circuitry 1206d of RF circuitry 1206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1, for example based on a carry out, to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1206d may be configured to generate a carrier frequency as the output frequency, while in other embodiments, the output frequency may be a multiple of the carrier frequency, for example twice the carrier frequency, four times the carrier frequency, and so on, and used in conjunction with quadrature generator and divider circuitry to generate multiple signals at the carrier frequency with multiple different phases with respect to each other. In some embodiments, the output frequency may be a local oscillator (LO) frequency (fLO). In some embodiments, RF circuitry 1206 may include an in-phase and quadrature (IQ) and/or polar converter.

FEM circuitry 1208 may include a receive signal path which may include circuitry configured to operate on RF signals received from one or more antennas 1210, amplify the received signals and provide the amplified versions of the received signals to the RF circuitry 1206 for further processing. FEM circuitry 808 may also include a transmit signal path which may include circuitry configured to amplify signals for transmission provided by RF circuitry 806 for transmission by one or more of the one or more antennas 1210.

In some embodiments, FEM circuitry 1208 may include a transmit/receive (TX/RX) switch to switch between transmit mode and receive mode operation. FEM circuitry 1208 may include a receive signal path and a transmit signal path. The receive signal path of FEM circuitry 1208 may include a low-noise amplifier (LNA) to amplify received RF signals and to provide the amplified received RF signals as an output, for example to RF circuitry 1206. The transmit signal path of FEM circuitry 1208 may include a power amplifier (PA) to amplify input RF signals, for example provided by RF circuitry 1206, and one or more filters to generate RF signals for subsequent transmission, for example by one or more of antennas 1210. In some embodiments, UE device 1200 may include additional elements such as, for example, memory and/or storage, display, camera, sensor, and/or input/output (I/O) interface, although the scope of the claimed subject matter is not limited in this respect.

The following are example implementations of the subject matter described herein. It should be noted that any of the examples and the variations thereof described herein may be used in any permutation or combination of any other one or more examples or variations, although the scope of the claimed subject matter is not limited in these respects. In example one, an apparatus of user equipment (UE) comprises circuitry to receive data transmissions as packet data convergence protocol (PDCP) packets from a radio bearer via two or more Radio Access Technologies (RATs), wherein one or more PDCP packets are offloaded from a first RAT to a second RAT, aggregate the received data PDCP packets, and report a status of the PDCP packets to the radio bearer. In example two, the subject matter of example one or any of the examples described herein further may include the apparatus comprising circuitry to generate a PDCP status report based at least in part on a last PDCP packet received via one of the two or more RATs. In example three, the subject matter of example one or any of the examples described herein further may include the PDCP status report comprising a bitmap of acknowledgment messages (ACKs) or negative acknowledgment messages (NACKs) based at least in part on a continuous PDCP count (PDCP COUNT) or a PDCP sequence number (PDCP SN), or a combination thereof. In example four, the subject matter of example one or any of the examples described herein further may include the apparatus comprising circuitry to generate the PDCP status report based least in part on a PDCP count (PDCP COUNT) or PDCP sequence number (PDCP SN) of one or more PDCP packets successfully received via the second RAT. In example five, the subject matter of example one or any of the examples described herein further may include the first RAT comprising a wireless wide area network, and the second RAT comprises a wireless local area network. In example six, the subject matter of example one or any of the examples described herein further may include the apparatus comprising circuitry to report the status of the PDCP packets using the first RAT, or the second RAT. In example seven, the subject matter of example one or any of the examples described herein further may include the apparatus comprising circuitry to report measurement metrics for the second RAT to the radio bearer via the first RAT. In example eight, the subject matter of example one or any of the examples described herein further may include the measurement metrics comprising WLAN modulation and coding scheme (MCS), WLAN received signal strength indicator (RSSI), WLAN channel utilization, WLAN backhaul rate, or a combination thereof. In example nine, the subject matter of example one or any of the examples described herein further may include the apparatus comprising circuitry to report metrics via radio resource control (RRC) signaling, or via PDCP signaling.

In example ten, an apparatus of an evolved Node B (eNB) may comprise circuitry to transmit data as packet data convergence protocol (PDCP) packets for transmissions via two or more Radio Access Technologies (RATs), wherein one or more PDCP packets are offloaded from a first RAT to a second RAT, send a message to a receiver of the PDCP packets one or more parameters for PDCP reporting, and receive a status report of the PDCP packets from the receiver of the PDCP packets. In example eleven, the subject matter of example ten or any of the examples described herein further may include the message sent to the receiver to instruct the receiver to send a PDCP status report periodically after a predefined interval of time. In example twelve, the subject matter of example ten or any of the examples described herein further may include the message sent to the receiver to instruct the receiver to send a PDCP status report after a certain number of PDCP packets have been received since a last PDCP reporting instance. In example thirteen, the subject matter of example ten or any of the examples described herein further may include the message sent to the receiver to instruct the receiver to send a PDCP status report of a difference of current PDCP count (PDCP COUNT) and a PDCP COUNT of a last packet reported in a last PDCP reporting instance is great than a predefined limit. In example fourteen, the subject matter of example ten or any of the examples described herein further may include the message sent to the receiver to instruct the receiver to send a PDCP status report on-demand using radio resource control (RRC) or other messaging. In example fifteen, the subject matter of example ten or any of the examples described herein further may include the apparatus comprising circuitry to mitigate or avoid Hyper Frame Number (HFN) desynchronization preventing more than about half of an available number of sequence numbers (SNs) to be in transmission at a given time. In example sixteen, the subject matter of example ten or any of the examples described herein further may include the apparatus comprising a temporary waiting buffer to buffer packets before assigning a PDCP SN while waiting for about more than half of a total number of SNs to be available. In example seventeen, the subject matter of example ten or any of the examples described herein further may include the apparatus comprising flow control circuitry estimate a buffer drain rate of the second RAT based at least in part on one or more PDCP status reports. In example eighteen, the subject matter of example ten or any of the examples described herein further may include the flow control circuitry to decide to offload data to equalize or nearly equalize a transmit buffer of the first RAT and a transmit buffer of the second RAT based at least in part on the estimate of the buffer drain rate. In example nineteen, the subject matter of example ten or any of the examples described herein further may include the flow control circuitry to decide to offload data to equalize or nearly equalize a delay or latency of PDCP packets the first RAT and the second RAT based at least in part on the estimate of the buffer drain rate. In example twenty, the subject matter of example ten or any of the examples described herein further may include the apparatus comprising link aggregation transmission circuitry to track a sequence number of a first missing packet in a reordering window at link aggregation reception circuitry at the receiver, and to maintain a sliding transmission window to control a number of PFCP packets that may be transmitted without being acknowledged.

In example twenty-one, one or more non-transitory computer-readable media having instructions that, if executed, cause a user equipment (UE) to receive data transmissions as packet data convergence protocol (PDCP) packets from an evolved Node B (eNB) via a wireless wide area network (WWAN) link or a wireless local area network (WLAN) link, wherein one or more PDCP packets are offloaded from the WWAN link to the WLAN link, aggregate the received data PDCP packets, and transmit a status of the PDCP packets to the eNB. In example twenty-two, the subject matter of example twenty-one or any of the examples described herein further may include the instructions, if executed, to cause the UE to transmit the status of the PDCP packets via a PDCP status report based at least in part on a last PDCP packet received via one of the WWAN or the WLAN. In example twenty-three, the subject matter of example twenty-one or any of the examples described herein further may include the PDCP status report comprising a bitmap of acknowledgment messages (ACKs) or negative acknowledgment messages (NACKs) based at least in part on a continuous PDCP count (PDCP COUNT) or a PDCP sequence number (PDCP SN), or a combination thereof. In example twenty-four, the subject matter of example twenty-one or any of the examples described herein further may include the instructions, if executed, to cause the UE to generate the PDCP status report based least in part on a PDCP count (PDCP COUNT) or PDCP sequence number (PDCP SN) of one or more PDCP packets successfully received via the second RAT. In example twenty-five, the subject matter of example twenty-one or any of the examples described herein further may include the WWAN being compliant with a Third Generation Partnership Project (3GPP) standard, and WLAN is compliant with an Institute of Electrical and Electronics Engineers (IEEE) 802.11 standard.

Although the claimed subject matter has been described with a certain degree of particularity, it should be recognized that elements thereof may be altered by persons skilled in the art without departing from the spirit and/or scope of claimed subject matter. It is believed that the subject matter pertaining to PDCP status reporting for multi-RAT offloading and many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. An apparatus of user equipment (UE) comprising circuitry to:
    receive data transmissions as packet data convergence protocol (PDCP) packets from a radio bearer via two or more Radio Access Technologies (RATs), wherein one or more PDCP packets are offloaded from a first RAT to a second RAT;
    aggregate the received data PDCP packets; and
    report a status of the PDCP packets to the radio bearer, wherein a PDCP status report is to be sent after a certain number of PDCP packets have been received since a last PDCP reporting instance.

2. The apparatus as claimed in claim 1, wherein the UE comprises baseband processing circuitry to generate a PDCP status report based at least in part on a last PDCP packet received via one of the two or more RATs.

3. The apparatus as claimed in claim 2, wherein the PDCP status report comprises a bitmap of acknowledgment messages (ACKs) or negative acknowledgment messages (NACKs) based at least in part on a continuous PDCP count (PDCP COUNT) or a PDCP sequence number (PDCP SN), or a combination thereof.

4. The apparatus as claimed in claim 2, wherein the apparatus comprises baseband processing circuitry to generate the PDCP status report based at least in part on a PDCP count (PDCP COUNT) or PDCP sequence number (PDCP SN) of one or more PDCP packets successfully received via the second RAT.

5. The apparatus as claimed in claim 2, wherein the apparatus comprises baseband processing circuitry to report metrics via radio resource control (RRC) signaling, or via PDCP signaling.

6. The apparatus as claimed in claim 1, wherein the first RAT comprises a wireless wide area network, and the second RAT comprises a wireless local area network.

7. The apparatus as claimed in claim 1, wherein the apparatus comprises baseband processing circuitry to report the status of the PDCP packets using the first RAT, or the second RAT.

8. The apparatus as claimed in claim 1, wherein the apparatus comprises baseband processing circuitry to report measurement metrics for the second RAT to the radio bearer via the first RAT.

9. The apparatus as claimed in claim 8, wherein the measurement metrics comprise wireless local area network modulation and coding scheme (WLAN MCS), WLAN received signal strength indicator (RSSI), WLAN channel utilization, WLAN backhaul rate, or a combination thereof.

10. An apparatus of an evolved Node B (eNB) comprising circuitry to:
    transmit data as packet data convergence protocol (PDCP) packets for transmissions via two or more Radio Access Technologies (RATs), wherein one or more PDCP packets are offloaded from a first RAT to a second RAT;

send a message to a receiver of the PDCP packets one or more parameters for PDCP reporting; and receive a status report of the PDCP packets from the receiver of the PDCP packets;

wherein the message sent to the receiver instructs the receiver to send a PDCP status report if a difference of a current PDCP count (PDCP COUNT) and a PDCP COUNT of a last packet reported in a last PDCP reporting instance is greater than a predefined limit.

11. The apparatus as claimed in claim 10, wherein the message sent to the receiver instructs the receiver to send a PDCP status report periodically after a predefined interval of time.

12. The apparatus as claimed in any of claim 10, wherein the message sent to the receiver instructs the receiver to send a PDCP status report after a certain number of PDCP packets have been received since a last PDCP reporting instance.

13. The apparatus as claimed in claim 10, wherein the message sent to the receiver instructs the receiver to send a PDCP status report on-demand using radio resource control (RRC) or other messaging.

14. The apparatus as claimed in claim 10, wherein the eNB comprises circuitry to mitigate or avoid Hyper Frame Number (HFN) desynchronization preventing more than about half of an available number of sequence numbers (SNs) to be in transmission at a given time.

15. The apparatus as claimed in claim 14, wherein the eNB comprises a temporary waiting buffer to buffer packets before assigning a PDCP SN while waiting for about more than half of a total number of SNs to be available.

16. The apparatus as claimed in claim 10, wherein the eNB comprises flow control circuitry to estimate a buffer drain rate of the second RAT based at least in part on one or more PDCP status reports.

17. The apparatus as claimed in claim 16, the flow control circuitry to decide to offload data to equalize a transmit buffer of the first RAT and a transmit buffer of the second RAT based at least in part on the estimate of the buffer drain rate.

18. The apparatus as claimed in claim 16, the flow control circuitry to decide to offload data to equalize a delay or latency of PDCP packets the first RAT and the second RAT based at least in part on the estimate of the buffer drain rate.

19. The apparatus as claimed in claim 10, wherein the eNB comprises link aggregation transmission circuitry to track a sequence number of a first missing packet in a reordering window at link aggregation reception circuitry at the receiver, and to maintain a sliding transmission window to control a number of PDCP packets that may be transmitted without being acknowledged.

20. One or more non-transitory computer-readable media having instructions that, if executed, cause a User Equipment (UE) to:

receive data transmissions as packet data convergence protocol (PDCP) packets from an evolved Node B (eNB) via a wireless wide area network (WWAN) link or a wireless local area network (WLAN) link, wherein one or more PDCP packets are offloaded from the WWAN link to the WLAN link;

aggregate the received data PDCP packets; and transmit a status of the PDCP packets to the eNB, wherein a PDCP status report is to be sent after a certain number of PDCP packets have been received since a last PDCP reporting instance.

21. The one or more non-transitory computer-readable media as claimed in claim 20, wherein the instructions, if executed, further cause the UE to transmit the status of the PDCP packets via a PDCP status report based at least in part on a last PDCP packet received via one of the WWAN or the WLAN.

22. The one or more non-transitory computer-readable media as claimed in claim 21, wherein the PDCP status report comprises a bitmap of acknowledgment messages (ACKs) or negative acknowledgment messages (NACKs) based at least in part on a continuous PDCP count (PDCP COUNT) or a PDCP sequence number (PDCP SN), or a combination thereof.

23. The one or more non-transitory computer-readable media as claimed in claim 21, wherein the instructions, if executed, further cause the UE to generate the PDCP status report based at least in part on a PDCP count (PDCP COUNT) or a PDCP sequence number (PDCP SN) of one or more PDCP packets successfully received via the WLAN link.

24. The one or more non-transitory computer-readable media as claimed in claim 21, wherein the WWAN is compliant with a Third Generation Partnership Project (3GPP) standard, and WLAN is compliant with an Institute of Electrical and Electronics Engineers (IEEE) 802.11 standard.

* * * * *